(12) United States Patent
Iyer et al.

(10) Patent No.: US 12,086,148 B2
(45) Date of Patent: *Sep. 10, 2024

(54) DETERMINATION OF USER INTENTION-BASED REPRESENTATIONS OF INTERNET RESOURCE IDENTIFICATION ITEMS AND SELECTION OF CONTENT ITEMS

(71) Applicant: Yahoo Ad Tech LLC, New York, NY (US)

(72) Inventors: Chander Jayaraman Iyer, Santa Clara, CA (US); Ivan Stojkovic, San Jose, CA (US); Eric Ye, Sunnyvale, CA (US); Lakshmi Narayan Bhamidipati, Sunnyvale, CA (US); Srinath Ravindran, Santa Clara, CA (US); Shubham Agrawal, Sunnyvale, CA (US)

(73) Assignee: Yahoo Ad Tech LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/244,593

(22) Filed: Sep. 11, 2023

(65) Prior Publication Data
US 2023/0418829 A1     Dec. 28, 2023

Related U.S. Application Data

(63) Continuation of application No. 17/719,408, filed on Apr. 13, 2022, now Pat. No. 11,755,594.

(51) Int. Cl.
G06F 16/2457     (2019.01)
G06F 16/248     (2019.01)
(Continued)

(52) U.S. Cl.
CPC ...... G06F 16/24575 (2019.01); G06F 16/248 (2019.01); G06F 40/205 (2020.01); G06F 40/30 (2020.01)

(58) Field of Classification Search
CPC ............ G06F 16/24575; G06F 16/248; G06F 40/205; G06F 40/30
See application file for complete search history.

(56) References Cited

U.S. PATENT DOCUMENTS 8,375,048 B1 * 2/2013 Wad ..................... G06F 16/3338
707/767
10,915,588 B2 * 2/2021 Bakis ..................... G06N 5/022
(Continued)

*Primary Examiner* — Jorge A Casanova
(74) *Attorney, Agent, or Firm* — Cooper Legal Group LLC

(57) ABSTRACT

One or more computing devices, systems, and/or methods are provided. In an example, an internet resource identification item associated with one or more internet resources may be identified. User activity information associated with a plurality of events may be analyzed to determine a plurality of sets of text associated with the internet resource identification item, wherein each set of text of the plurality of sets of text is associated with an event, of the plurality of events, associated with an internet resource of the one or more internet resources. A plurality of term representations may be determined based upon the plurality of sets of text. A user intention-based representation associated with the internet resource identification item may be generated based upon the plurality of term representations. A content item may be selected for presentation via a client device based upon the user intention-based representation.

20 Claims, 14 Drawing Sheets

(51) Int. Cl.
    *G06F 40/205*     (2020.01)
    *G06F 40/30*     (2020.01)

(56) References Cited

U.S. PATENT DOCUMENTS

| | | | |
|---|---|---|---|
| 11,003,667 B1* | 5/2021 | Bakir | G06F 16/24575 |
| 2008/0154877 A1* | 6/2008 | Joshi | G06F 16/332 |
| | | | 707/999.005 |
| 2010/0228712 A1* | 9/2010 | Wexler | G06Q 30/0256 |
| | | | 707/706 |
| 2015/0278358 A1* | 10/2015 | Abib | G06F 16/9535 |
| | | | 707/706 |
| 2017/0270159 A1* | 9/2017 | Wang | G06F 16/2425 |
| 2020/0159803 A1* | 5/2020 | Bacha | G06F 16/90332 |
| 2020/0334307 A1* | 10/2020 | Prasad | G06F 16/9535 |
| 2021/0042372 A1* | 2/2021 | Huang | G06N 20/00 |
| 2021/0056115 A1* | 2/2021 | Shaw | G06F 16/24556 |
| 2022/0083558 A1* | 3/2022 | Fujii | G06F 16/248 |
| 2022/0222260 A1* | 7/2022 | Lin | G06F 16/9535 |

* cited by examiner

DETERMINATION OF USER INTENTION-BASED REPRESENTATIONS OF INTERNET RESOURCE IDENTIFICATION ITEMS AND SELECTION OF CONTENT ITEMS

RELATED APPLICATION

This application claims priority to and is a continuation of U.S. application Ser. No. 17/719,408, filed on Apr. 13, 2022, entitled "DETERMINATION OF USER INTENTION-BASED REPRESENTATIONS OF INTERNET RESOURCE IDENTIFICATION ITEMS AND SELECTION OF CONTENT ITEMS", which is incorporated by reference herein in its entirety.

BACKGROUND

Many services, such as websites, applications, etc. may provide platforms for viewing media. For example, a user may interact with a service. While interacting with the service, selected media may be presented to the user automatically.

SUMMARY

In accordance with the present disclosure, one or more computing devices and/or methods are provided. In an example, a first internet resource identification item associated with one or more first internet resources may be identified. User activity information associated with a plurality of events may be analyzed to determine a plurality of search queries associated with the first internet resource identification item, wherein each search query of the plurality of search queries is associated with an event, of the plurality of events, in which an internet resource of the one or more first internet resources is accessed via a selection of a search result from among search results generated based upon the search query. A plurality of term representations may be determined based upon the plurality of search queries, wherein the plurality of term representations comprises one or more first term representations of one or more first terms of a first search query of the plurality of search queries and/or one or more second term representations of one or more second terms of a second search query of the plurality of search queries. A first user intention-based representation associated with the first internet resource identification item may be generated based upon the plurality of term representations. A first content item may be selected for presentation via a first client device based upon the first user intention-based representation.

In an example, a first internet resource identification item associated with one or more first internet resources may be identified. User activity information associated with a plurality of events may be analyzed to determine a plurality of sets of text associated with the first internet resource identification item, wherein each set of text of the plurality of sets of text is associated with an event, of the plurality of events, associated with an internet resource of the one or more first internet resources. A plurality of term representations may be determined based upon the plurality of sets of text, wherein the plurality of term representations comprises one or more first term representations of one or more first terms of a first set of text of the plurality of sets of text and/or one or more second term representations of one or more second terms of a second set of text of the plurality of sets of text. A first user intention-based representation associated with the first internet resource identification item may be generated based upon the plurality of term representations. A first content item may be selected for presentation via a first client device based upon the first user intention-based representation.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
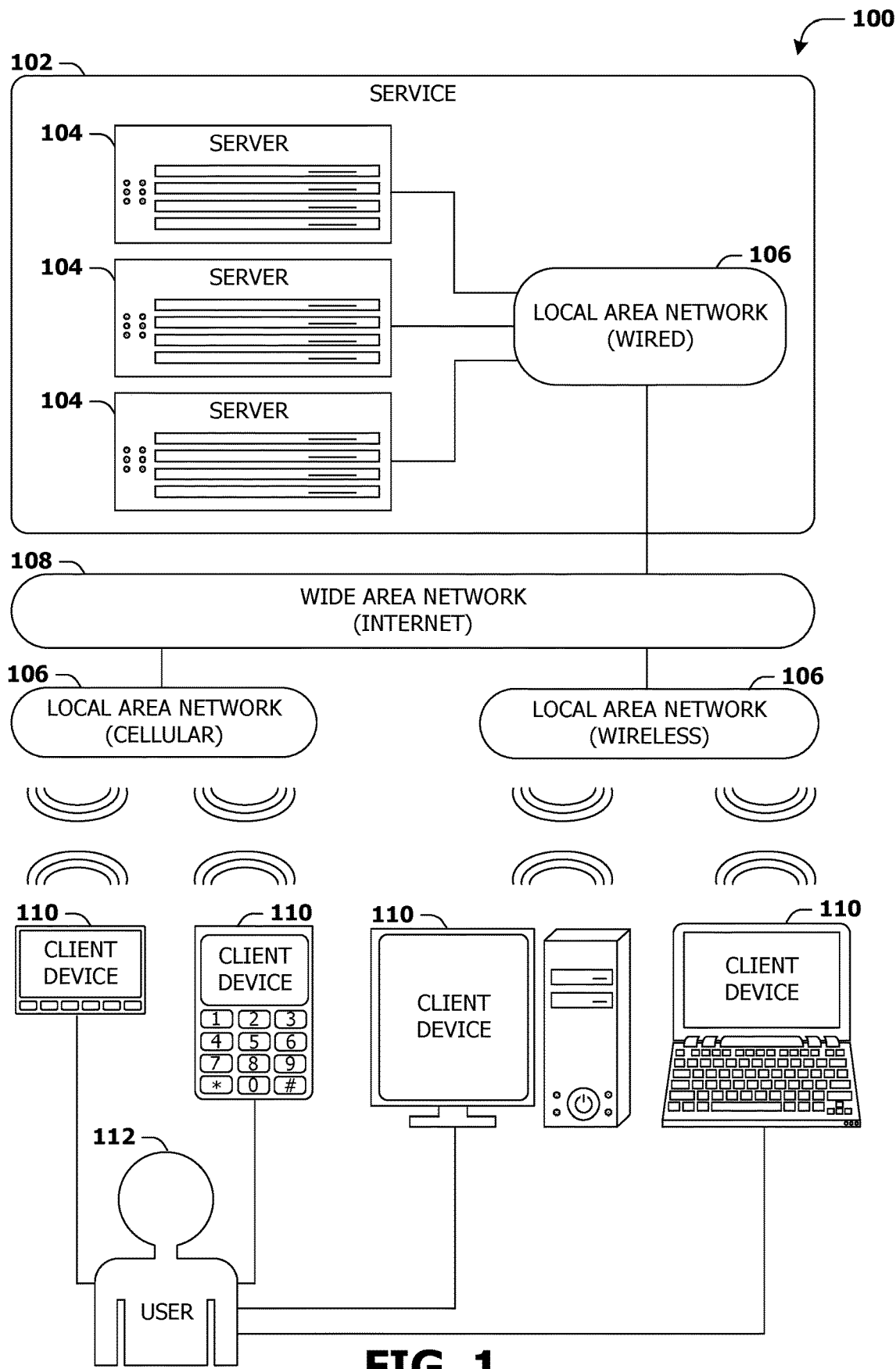
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
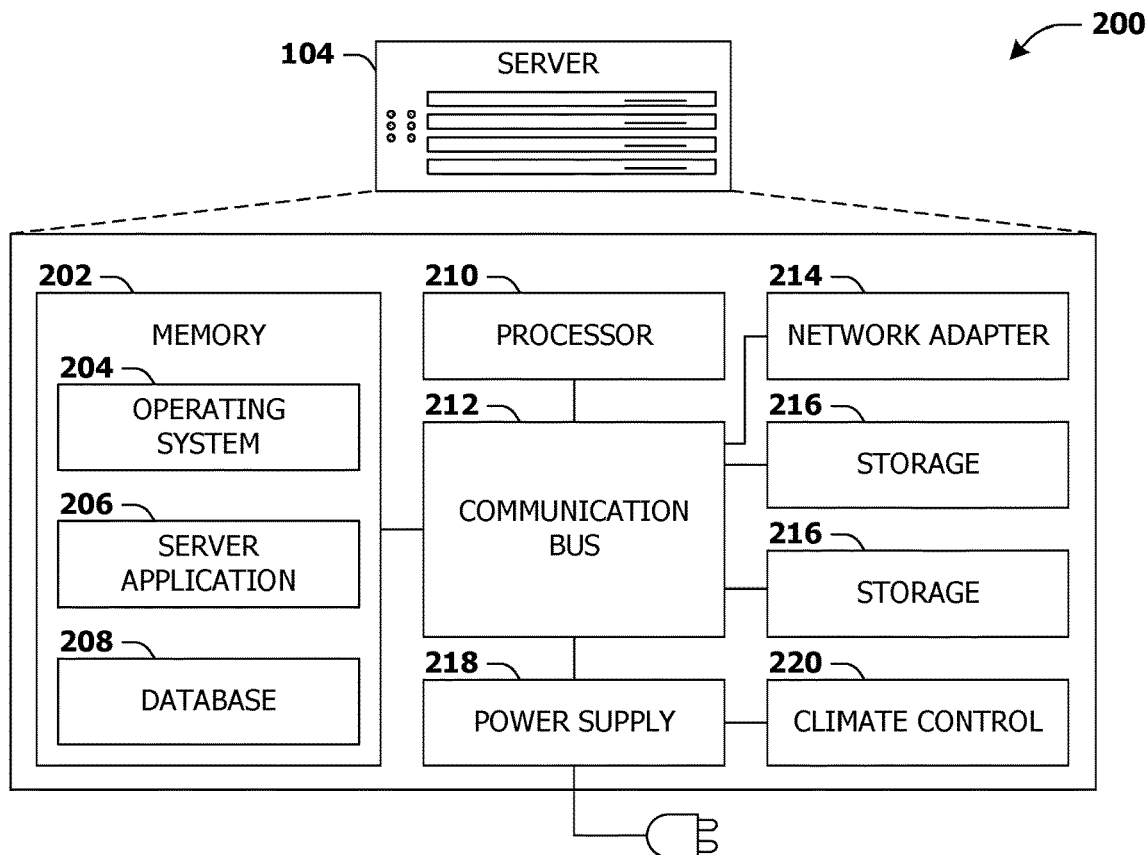
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
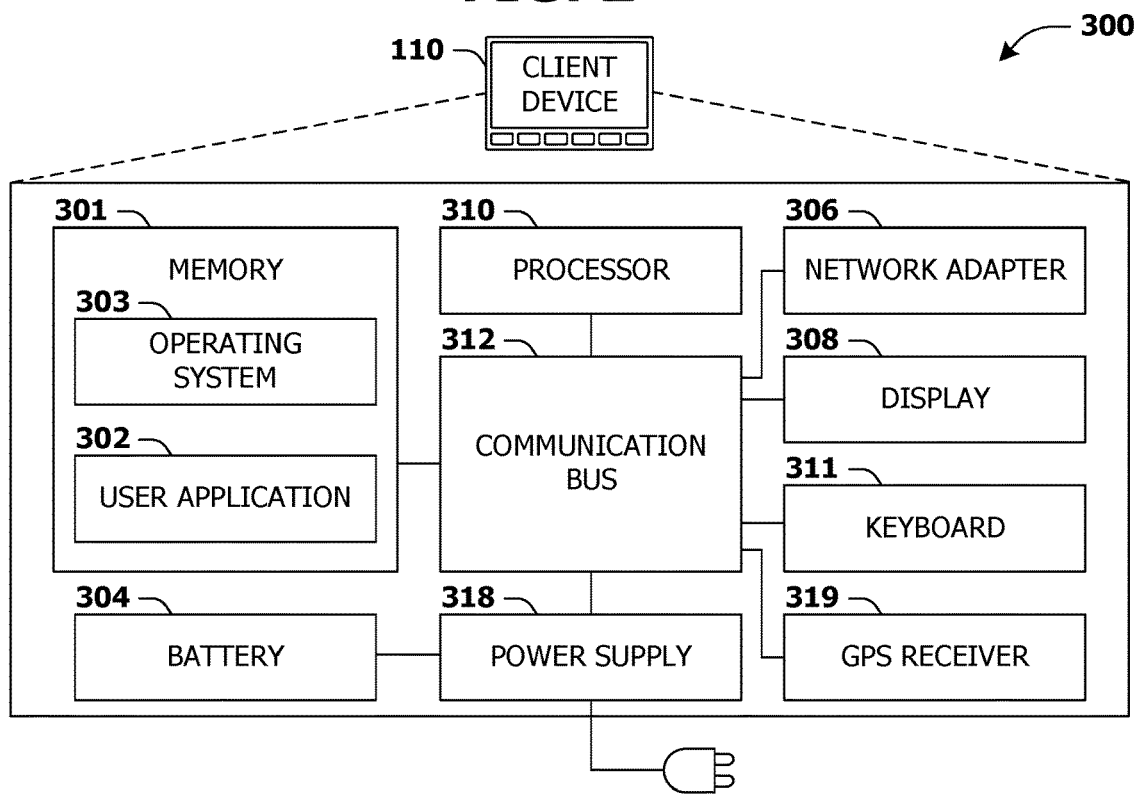
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining user intention-based representations associated with internet resource identification items and/or selecting content for transmission to devices are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use user activity information associated with the user to select content for presentation to the user. For example, the user activity information may be indicative of web addresses of internet resources (e.g., web pages) accessed by the user. Accordingly, information indicative of characteristics of internet resources accessed by the user may be used to more accurately select content that the user is interested in.

Thus, in accordance with one or more of the techniques presented herein, a first internet resource identification item associated with one or more first internet resources may be identified. In an example, the first internet resource identification item may comprise at least a portion of a domain name (e.g., a domain name of a website) associated with the one or more first internet resources and/or at least a portion of a web address (e.g., a uniform resource locator (URL)) associated with the one or more first internet resources. User activity information associated with a plurality of events may be analyzed to determine a plurality of sets of text associated with the first internet resource identification item, wherein each set of text of the plurality of sets of text is associated with an event, of the plurality of events, associated with an internet resource of the one or more first internet resources. In an example, the plurality of sets of text may comprise at least one of search queries, product names, page titles, mail subjects, etc. A plurality of term representations may be determined based upon the plurality of sets of text. A first user intention-based representation associated with the first internet resource identification item may be generated based upon the plurality of term representations.

In some examples, content may be selected for transmission to one or more client devices based upon the first user intention-based representation. For example, a first profile associated with the first internet resource identification item may be generated based upon the first user intention-based representation. The first profile may be used for selecting content for transmission to client devices that are determined to have accessed an internet resource of the one or more first internet resources (associated with the first internet resource identification item).

In some examples, the first profile may be generated based upon information associated with one or more other internet resource identification items, other than the first internet resource identification item. A plurality of user intention-based representations associated with a plurality of internet resource identification items may be generated. The plurality of user intention-based representations may comprise the first user internet-based representation and/or the plurality of internet resource identification items may comprise the first internet resource identification item. A similarity profile may be generated based upon the plurality of user intention-based representations. For example, the similarity profile may be indicative of similarity scores corresponding to levels of similarity between internet resource identification items of the plurality of internet resource identification items. A plurality of sets of information associated with a subset of internet resource identification items of the plurality of internet resource identification items may be determined (e.g., at least some information of one, some and/or all sets of information of the plurality of sets of information may be manually curated). Information of the plurality of sets of information may be propagated to (e.g., included in) the first profile associated with the first internet resource identification item based upon the similarity profile. For example, one or more sets of information, of the plurality of sets of information, may be propagated to the first profile based upon a determination that one or more similarity scores corresponding to levels of similarity between the first internet resource identification item and one or more internet resource identification items meet (e.g., are equal to or exceed) a threshold similarity score. In an example, the one or more sets of information included in the first profile may be indicative of characteristics of internet resources. The characteristics may be indicative of one or more intentions and/or one or more interests of a user that accesses an internet resource associated with the first internet resource identification item. Due to propagation of the one or more sets of information to the first profile, whether or not a user that accessed an internet resource associated with the first internet resource identification item is part of a target audience of a content item may be more accurately determined. More accurately determining whether the user is part of the target audience of the content item may result in more accurately selection of a content item to the user. Alternatively and/or additionally, using the techniques provided herein for propagating information to profiles associated with internet resource identification items provides for determining profile information for internet resource identification items with at least one of less manual effort, fewer computations, increased speed, etc., such as due to not requiring that profile information (e.g., information to be included in a profile associated with an internet resource identification item) be determined separately for each internet resource identification item of the plurality of internet resource identification items.

Figure 4:
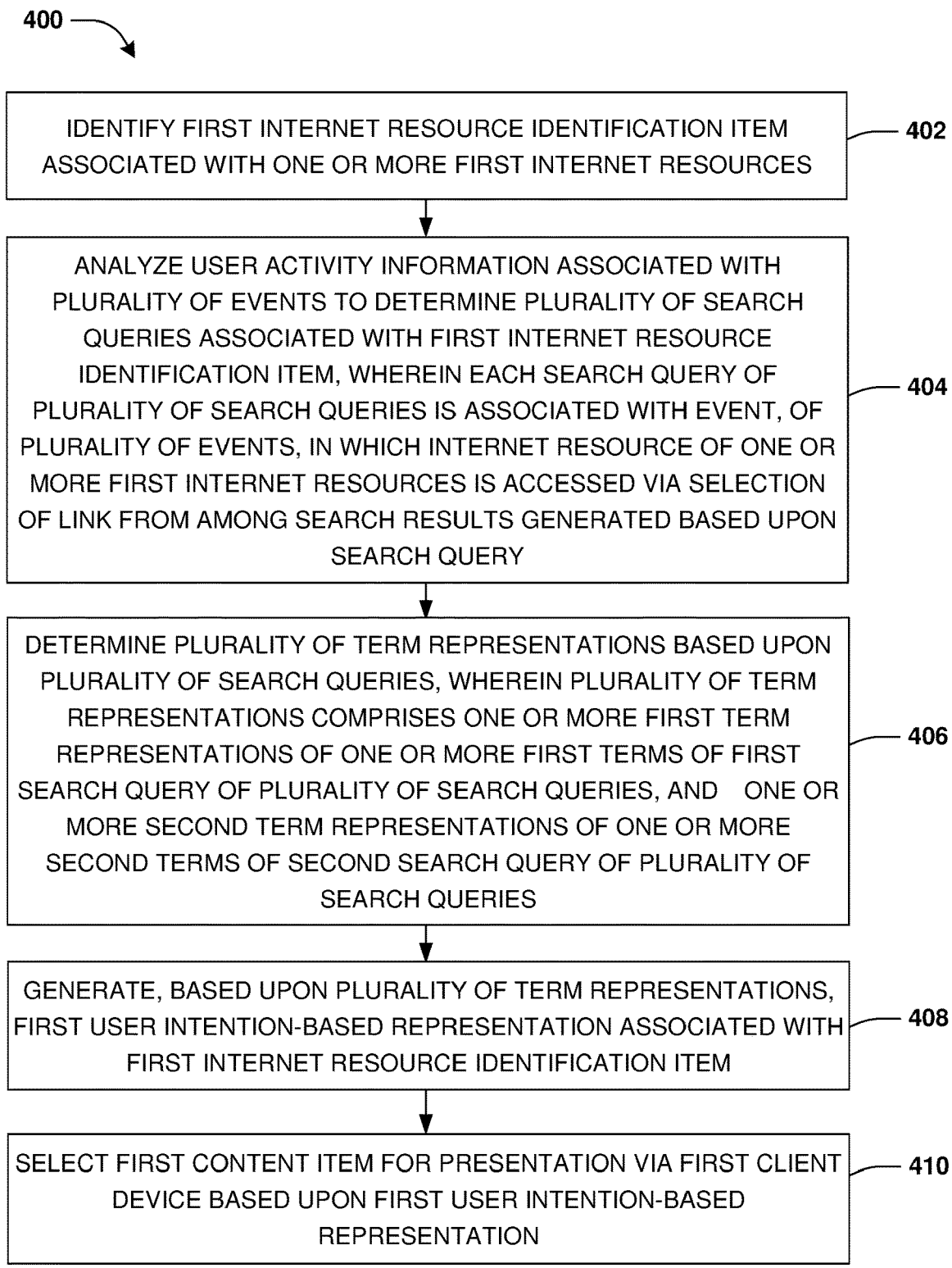
FIG. 4 is a flow chart illustrating an example method for determining user intention-based representations associated with internet resource identification items and/or selecting content for transmission to devices.

An embodiment of determining user intention-based representations associated with internet resource identification items and/or selecting content for transmission to devices is illustrated by an example method 400 of FIG. 4. At 402, a first internet resource identification item associated with one or more first internet resources may be identified. In an example, the first internet resource identification item may comprise at least a portion of a domain name (e.g., a domain name of a website) associated with the one or more first internet resources and/or at least a portion of a web address (e.g., a uniform resource locator (URL)) associated with the one or more first internet resources. In an example, an internet resource of the one or more first internet resources may be a web page that has a web address comprising and/or matching the first internet resource identification item. In an example, the first internet resource identification item may be "floridastuff.com" (e.g., a domain name) and/or the one or more first internet resources may correspond to web pages that have web addresses comprising "floridastuff.com", such as at least one of "www.floridastuff.com/index.html", "www.floridastuff.com/fun-activities.html", etc.

At 404, user activity information associated with a plurality of events may be analyzed to determine a first plurality of search queries associated with the first internet resource identification item. In some examples, the user activity information may be associated with a period of time (e.g., the plurality of events may be events that are performed within the period of time), such as a period of 6 months, a period of 12 months, a period of 13 months, or other period of time. In some examples, the user activity information may be determined via aggregating user activity of a plurality of users and/or a plurality of client devices (e.g., the plurality of events may comprise events associated with different users and/or different client devices). Each search query of the first plurality of search queries is associated with an event, of the plurality of events, in which an internet resource of the one or more first internet resources (associated with the first internet resource identification item) is accessed via a selection of a search result from among search results generated based upon the search query.

Figure 5A:
FIG. 5A is a component block diagram illustrating an example system for determining user intention-based representations associated with internet resource identification items and/or selecting content for transmission to devices, where a first client device presents a first web page.
Figure 5B:
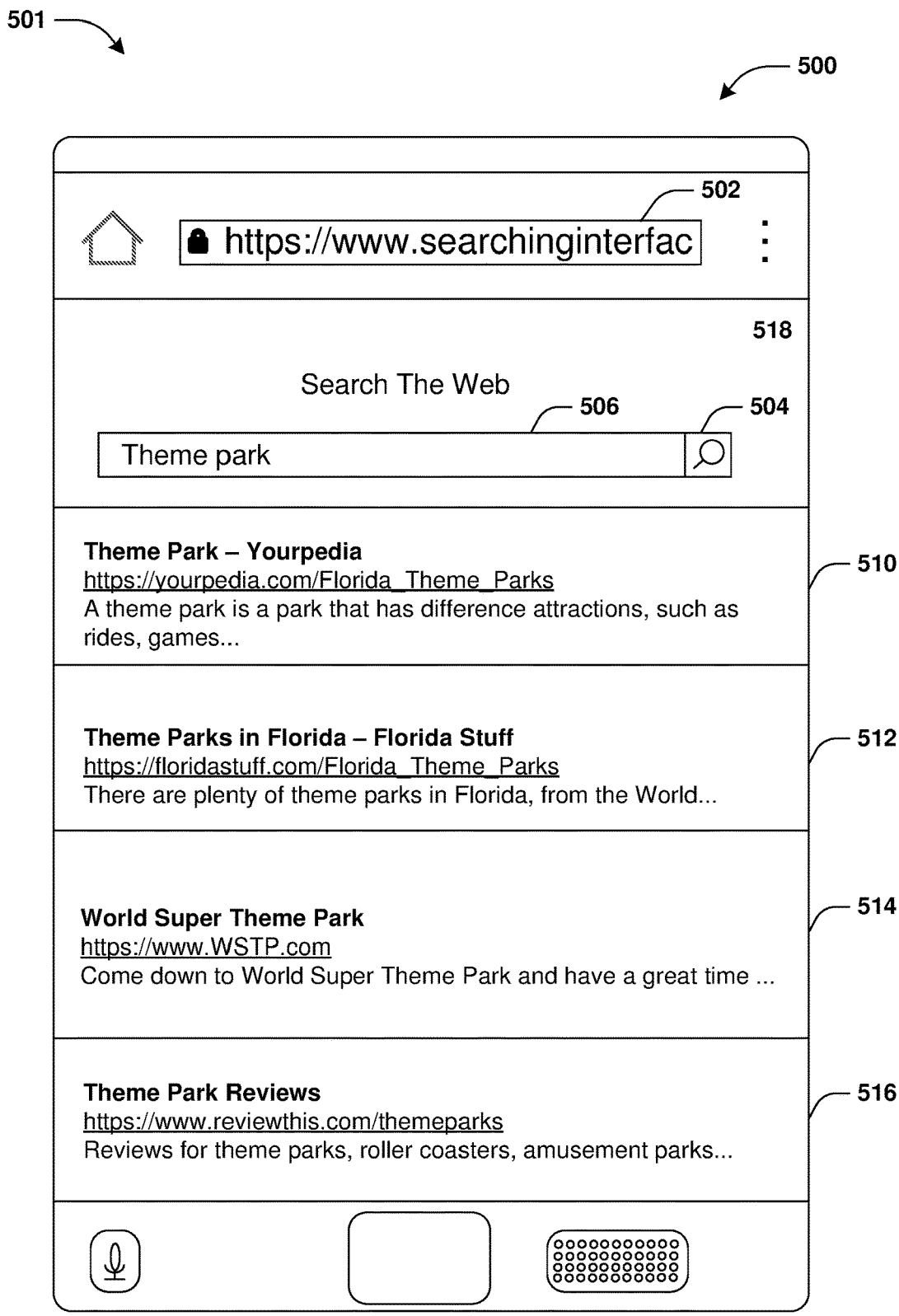
FIG. 5B is a component block diagram illustrating an example system for determining user intention-based representations associated with internet resource identification items and/or selecting content for transmission to devices, where a first client device presents a plurality of search results.
Figure 5C:
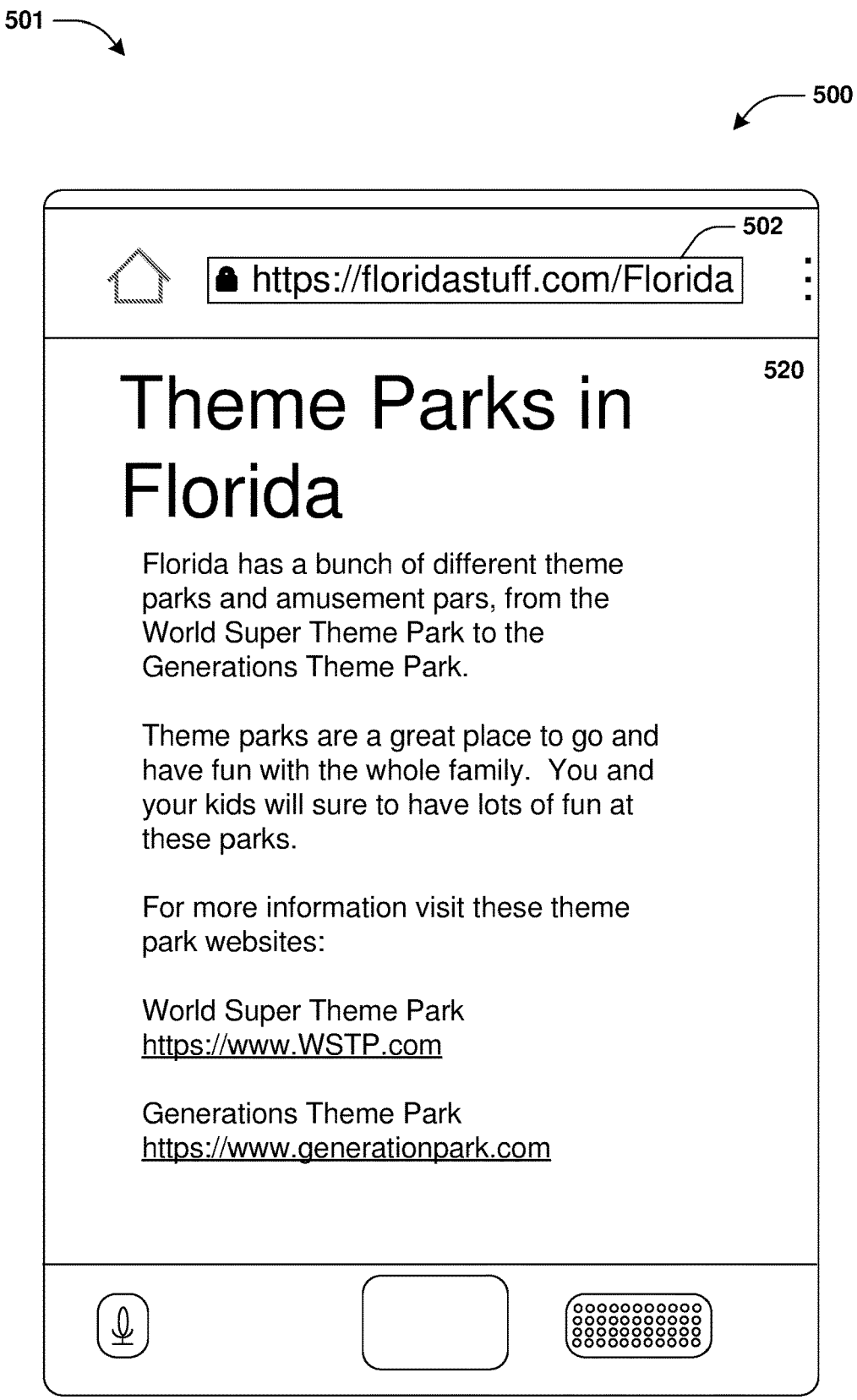
FIG. 5C is a component block diagram illustrating an example system for determining user intention-based representations associated with internet resource identification items and/or selecting content for transmission to devices, where a first client device presents a fourth web page.

FIGS. 5A-5I illustrate examples of an example system 501 for determining user intention-based representations associated with internet resource identification items and/or selecting content for transmission to devices, described with respect to the method 400 of FIG. 4. FIGS. 5A-5C illustrate an example of a first event, of the plurality of events, in which an internet resource of the one or more first internet resources is accessed via a selection of a search result from among search results generated based upon a search query.

FIG. 5A illustrates a first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a first search query "Theme Park" may be entered into the search field 506. In some examples, the first web page 508 may comprise a search selectable input 504 corresponding to performing a search based upon the first search query. For example, the search selectable input 504 may be selected.

FIG. 5B illustrates the first client device 500 presenting a plurality of search results associated with the first search query using the browser of the first client device 500. For example, the plurality of search results may be presented within a second web page 518. For example, the plurality of search results may comprise a first search result 510 corresponding to a third web page, a second search result 512 corresponding to a fourth web page 520 (illustrated in FIG. 5C), a third search result 514 corresponding to a fifth web page and/or a fourth search result 516 corresponding to a sixth web page. In some examples, each search result of the plurality of search results may comprise a selectable input (e.g., a link) corresponding to accessing a web page associated with the search result. In some examples, the second search result 512 corresponding to the fourth web page 520 may be selected (e.g., the second search result 512 may be selected via a second selectable input corresponding to the second search result 512).

FIG. 5C illustrates the first client device 500 presenting and/or accessing the fourth web page 520 in response to the selection of the second search result 512. In some examples, the user activity information may comprise a set of event information associated with the first event. For example, the set of event information may comprise an indication of the first search query (e.g., "Theme park") entered into the search interface and/or used to generate the plurality of search results. Alternatively and/or additionally, the set of event information may comprise an indication of a web address (e.g., "www.searchinginterface.com/search?q=Theme+park") of the second web page 518 comprising the plurality of search results. Alternatively and/or additionally, the set of event information may comprise an indication of a web address (e.g., "floridastuff.com/Florida_Theme_Parks") of the fourth web page 520 accessed via the selection of the second search result 512 from among the plurality of search results. It may be determined that the second web page 518 is associated with the first internet resource identification item based upon the web address of the fourth web page 520 (e.g., based upon a determination that the web address of the fourth web page 520 comprises the first internet resource identification item). Alternatively and/or additionally, the first search query (e.g., "Theme park") that led to the first client device 500 accessing the second web page 518 may be determined based upon the set of event information. In an example, the first search query may be determined based upon, such as extracted from, the web address (e.g., "www.searchinginterface.com/search?q=Theme+park") of the second web page 518 comprising the plurality of search results.

In an example, each event of the plurality of events may comprise an internet resource (e.g., a web page) of the one or more first internet resources being accessed via a selection of a search result from among search results generated based upon a search query. Other events (other than the first event) of the plurality of events may be identified using one or more of the techniques provided herein with respect to identifying the first event. Alternatively and/or additionally, other search queries (other than the first search query) of the first plurality of search queries may be determined using one or more of the techniques provided herein with respect to determining the first search query.

Search queries of the first plurality of search queries are related to (e.g., are reflective and/or indicative of) intentions, of users, in accessing internet resources (e.g., web pages) associated with the first internet resource identification item. Using one or more of the techniques provided herein, at least some of the first plurality of search queries may be used to generate a first user intention-based representation associated with the first internet resource identification item.

In some examples, the first plurality of search queries is a subset of search queries of a second plurality of search queries associated with the first internet resource identification item. For example, each search query of the second plurality of search queries is associated with an event, of the plurality of events, in which an internet resource of the one or more first internet resources (associated with the first internet resource identification item) is accessed via a selection of a search result from among search results generated based upon the search query. The subset of search queries may be selected from the second plurality of search queries if a quantity of search queries, of the second plurality of search queries, exceeds a threshold quantity of search queries k. Alternatively and/or additionally, if the quantity of search queries of the second plurality of search queries does not exceed the threshold quantity of search queries k, the first plurality of search queries may comprise all of the second plurality of search queries. In some examples, a plurality of search query scores associated with the second plurality of search queries may be determined (e.g., each search query score of the plurality of search query scores may be associated with a search query of the second plurality of search queries). In an example, a first search query score (of the plurality of search query scores) associated with the first search query may be determined based upon a measure of events, of the plurality of events, associated with the first search query. For example, the measure of events may correspond to a quantity and/or frequency of events, of the plurality of events, in which an internet resource of the one or more first internet resources (associated with the first internet resource identification item) is accessed via search results generated based upon the first search query. In some examples, the first search query score may be based upon (e.g., may be equal to) the measure of events associated with the first search query (e.g., the first search query score may be a function of the measure of events, wherein an increase of the measure of events results in an increase of the first search query score). Other search query scores of the plurality of search query scores (other than the first search query score) may be determined using one or more of the techniques provided herein with respect to determining the first search query score.

The first plurality of search queries (used to generate the first user intention-based representation) may be selected from the second plurality of search queries based upon the plurality of search query scores. In some examples, the first plurality of search queries may be selected from the second plurality of search queries based upon a determination that the first plurality of search queries are associated with highest search query scores of the plurality of search query scores. Alternatively and/or additionally, the first plurality of search queries may be selected from the second plurality of search queries based upon a determination that the first plurality of search queries are associated with k highest search query scores of the plurality of search query scores (e.g., search queries associated with the k highest search query scores of the plurality of search query scores may be included in the first plurality of search queries). In an example where k (e.g., the threshold quantity of search queries) is 1,000, 1,000 search queries associated with 1,000 highest search query scores of the plurality of search query scores may be selected and/or included in the first plurality of search queries. Alternatively and/or additionally, the second plurality of search queries may be ranked based upon the plurality of search query scores (e.g., a search query having a higher search query score of the plurality of search query scores is ranked higher than a search query having a lower search query score of the plurality of search query scores), and/or the top k ranked search queries may be selected from among the second plurality of search queries (e.g., the top k ranked search queries may be included in the first plurality of search queries). Alternatively and/or additionally, the first plurality of search queries may be selected from the second plurality of search queries based upon a determination that the first plurality of search queries are associated with search query scores (of the plurality of search query scores) that meet (e.g., are equal to or exceed) a first threshold search query score (e.g., search queries that are associated with search query scores, of the plurality of search query scores, that do not meet the first threshold search query score, may not be included in first plurality of search queries).

Figure 5D:
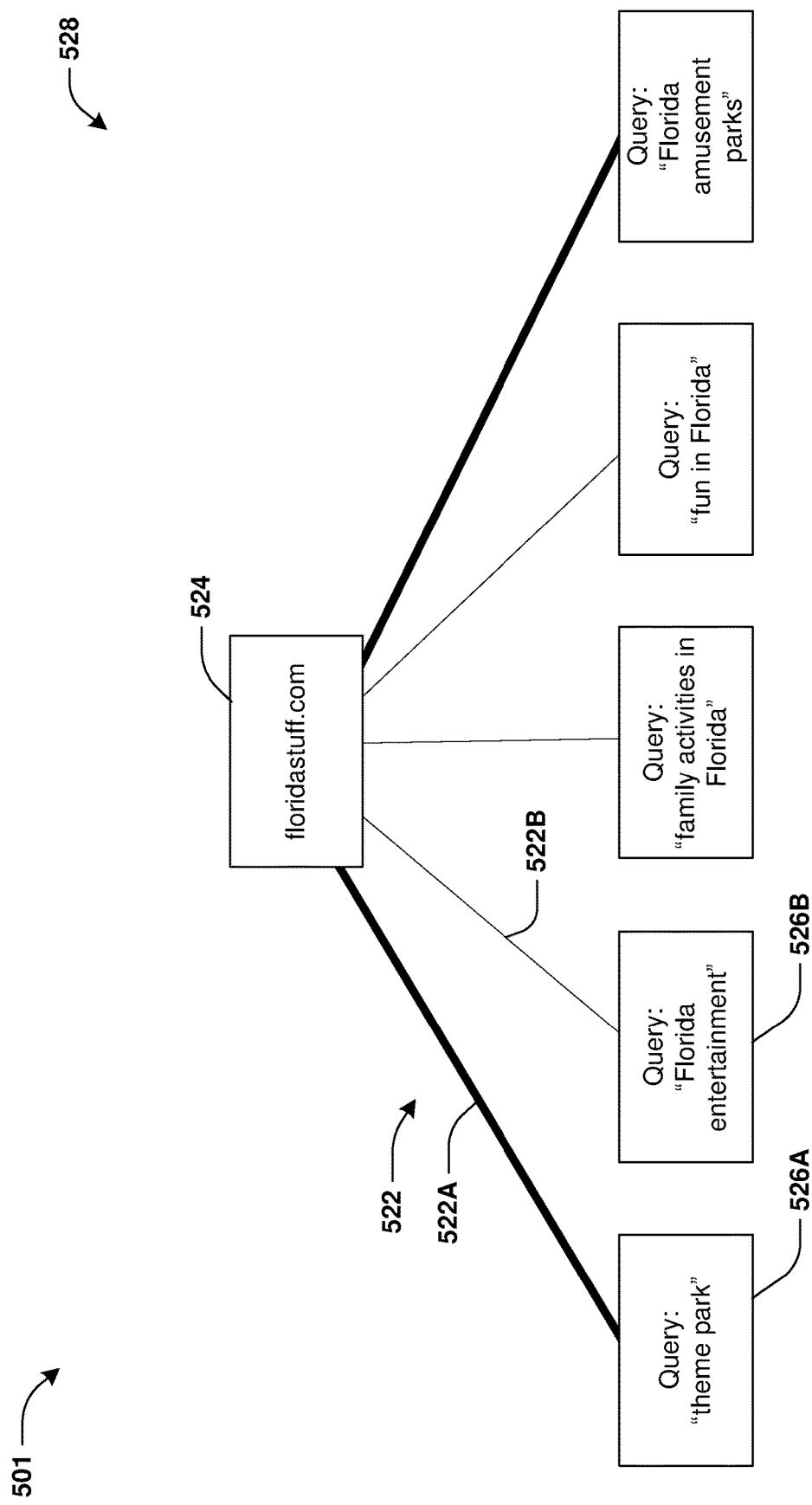
FIG. 5D is a component block diagram illustrating a representation of a first search-to-click profile generated by an example system for determining user intention-based representations associated with internet resource identification items and/or selecting content for transmission to devices.

In some examples, a first search-to-click profile associated with the first internet resource identification item may be generated. The first search-to-click profile may be generated based upon the user activity information associated with the plurality of events. In an example, the first search-to-click profile may be indicative of the second plurality of search queries and/or the plurality of search query scores associated with the second plurality of search queries. FIG. 5D illustrates a representation 528 of the first search-to-click profile. In some examples, the representation 528 may correspond to a graph, such as a bipartite graph. The representation 528 may comprise relationship lines 522 (e.g., edges). A relationship line of the relationship lines 522 may be between a search query 526 of the second plurality of search queries (e.g., "theme park" 526A, "Florida entertainment" 526B, etc.) and the first internet resource identification item (shown with reference number 524). A relationship line of the relationship lines 522 between a search query 526 and the first internet resource identification item 524 may be indicative of at least one event, of the plurality of events, having occurred in association with the search query 526 and the first internet resource identification item 524 (e.g., at least one event having occurred in which an internet resource of the one or more first internet resources associated with the first internet resource identification item 524 is accessed via search results generated based upon the search query 526).

In some examples, a relationship line of the relationship lines 522 between a search query 526 and the first internet resource identification item 524 may have a weight (represented by thickness in FIG. 5D, for example) corresponding to a search query score associated with the search query 526. In an example, a first relationship line 522A of the relationship lines 522 may be between a search query "theme park" 526A and the first internet resource identification item 524. A second relationship line 522B of the relationship lines 522 may be between a search query "Florida entertainment" 526B and the first internet resource identification item 524. A weight of the first relationship line 522A (e.g., a search query score, of the plurality of search query scores, associated with the search query "theme park" 526A) may be greater than a weight of the second relationship line 522B (e.g., a search query score, of the plurality of search query scores, associated with the search query "Florida entertainment" 526B). Accordingly, a measure (e.g., quantity and/or frequency) of events, of the plurality of events, associated with the search query "theme park" 526A may be greater than a measure (e.g., quantity and/or frequency) of events, of the plurality of events, associated with the search query "Florida entertainment" 526B.

In an example in which the first plurality of search queries is a subset of the second plurality of search queries, the first plurality of search queries may be selected from the second plurality of search queries based upon the first search-to-click profile.

At 406, a plurality of term representations may be determined based upon the first plurality of search queries. In an example, the plurality of term representations may comprise at least one of one or more first term representations of one or more first terms of the first search query of the first plurality of search queries, one or more second term representations of one or more second terms of a second search query of the first plurality of search queries, etc.

In an example, a term of a search query may correspond to at least one of a token, a word, a phrase, a portion, etc. of the search query. In an example, a tokenization module may be used to split a search query of the first plurality of search queries into terms (e.g., words), wherein the plurality of term representations may comprise term representations of the terms. In an example in which the first search query is "theme park", the one or more first terms of the first search query may comprise a term "theme" and a term "park". In some examples, one, some and/or all term representations of the plurality of term representations are vector representations (e.g., embeddings and/or embedding-based representations) of terms of the first plurality of search queries. In an example, one, some and/or all term representations of the plurality of term representations are word vector representations (e.g., word embeddings and/or word embedding-based representations) of words of the first plurality of search queries.

In some examples, the plurality of term representations may be generated using a term representation determination module. In an example, a term of a search query may be input to the term representation determination module and the term representation determination module may output a term representation, of the plurality of term representations, based upon the term. In an example, the term representation determination module may comprise a list of term representations associated with a plurality of terms, wherein a term representation of a term may be based upon the list of term representations. In an example, the list of term representations may comprise pre-trained term representations (e.g., pre-trained word embeddings) associated with the plurality of terms. In an example, the term representation determination module may use Fasttext pre-trained word embeddings and/or other suitable pre-trained word embeddings. The list of term representations may comprise term representations for terms of multiple languages. For example, the multiple languages may comprise a first language and a second language. The list of term representations may comprise a first set of term representations for terms of the first language and a second set of term representations for terms of the second language. In some examples, the first set of term representations may be generated by a first model associated with the first language and/or the second set of term representations may be generated by a second model associated with the second language. In an example, one or more first search queries of the first plurality of search queries may be in the first language and/or one or more second search queries of the first plurality of search queries may be in the second language. Term representations of the one or more first search queries may be determined based upon the first set of term representations. Term representations of the one or more second search queries may be determined based upon the second set of term representations.

For example, the plurality of term representations may comprise a plurality of sets of term representations, wherein for each search query of the first plurality of search queries, the plurality of sets of term representations comprises a set of term representations comprising one or more term representations of one or more terms of the search query. In an example, a first set of term representations of the plurality of sets of term representations may comprise the one or more first term representations of the one or more first terms of the first search query, a second set of term representations of the plurality of sets of term representations may comprise the one or more second term representations of the one or more second terms of the second search query, etc.

Figure 5E:
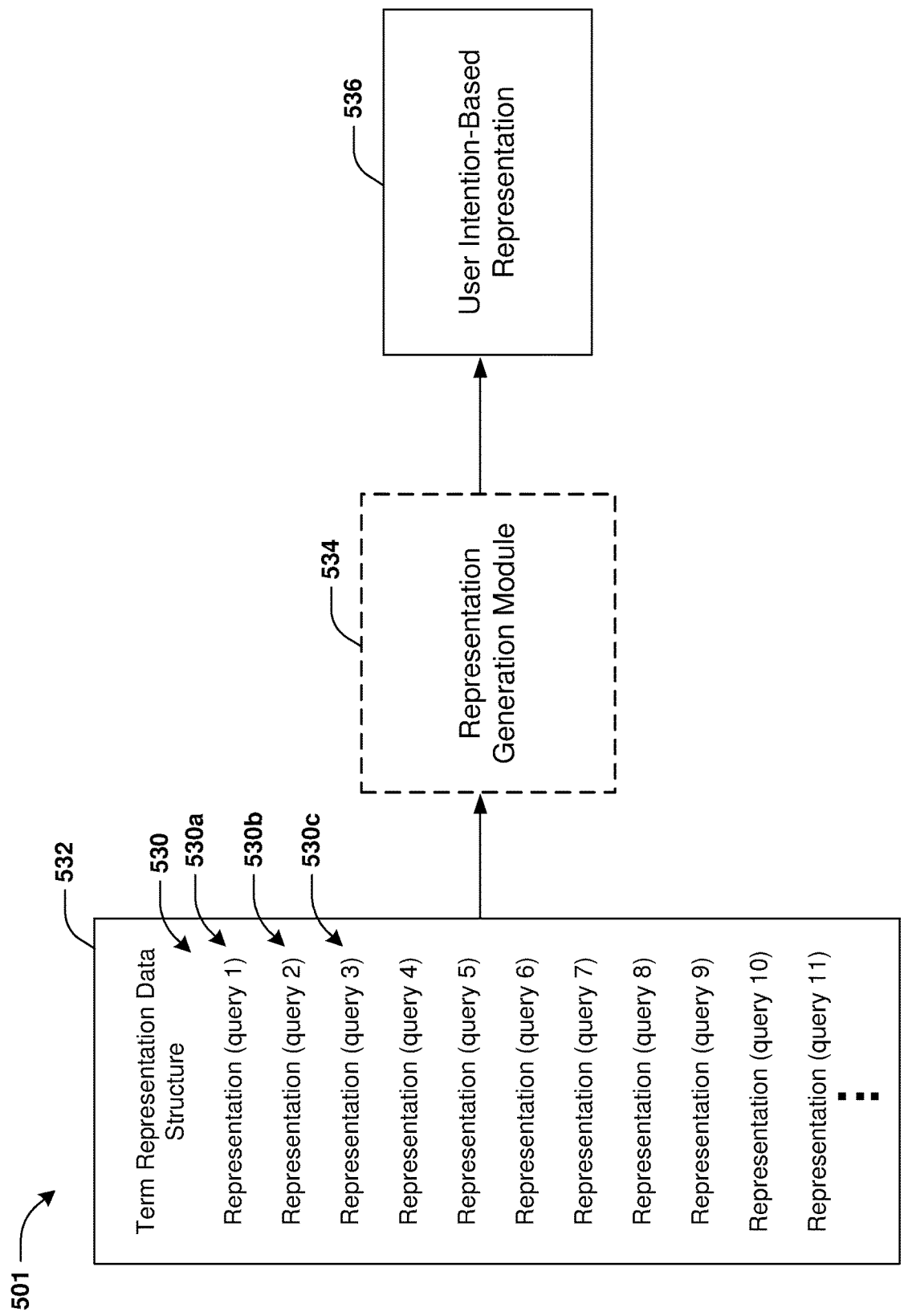
FIG. 5E is a component block diagram illustrating an example system for determining user intention-based representations associated with internet resource identification items and/or selecting content for transmission to devices, where a first user intention-based representation is generated.

In some examples, term representations of the plurality of term representations are combined to generate a term representation data structure associated with the first internet resource identification item 524. For example, some and/or all sets of term representations of the plurality of sets of term representations may be concatenated to generate the term representation data structure. An example of the term representation data structure (shown with reference number 532) is shown in FIG. 5E. The term representation data structure 532 may comprise the plurality of sets of term representations (shown with reference number 530). In the example shown in FIG. 5E, the term representation data structure 532 may comprise a set of term representations 530a associated with search query "query 1" of the first plurality of search queries, followed by a set of term representations 530b associated with search query "query 2" of the first plurality of search queries, followed by a set of term representations 530c associated with search query "query 3" of the first plurality of search queries, etc. In an example, an order in which sets of term representations are arranged (e.g., concatenated) in the term representation data structure 532 is based upon search query scores of the plurality of search query scores. For example, the sets of term representations may be arranged in the term representation data structure 532 in decreasing order of search query scores, such as where the set of term representations 530a associated with search query "query 1" is arranged preceding (e.g., ahead of, in front of, above, etc.) the set of term representations 530b associated with search query "query 2" due to a search query score associated with search query "query 1" being higher than a search query score associated with search query "query 2".

At 408, the first user intention-based representation associated with the first internet resource identification item 524 may be generated based upon the plurality of term representations. For example, the first user intention-based representation may be generated based upon the term representation data structure 532 (comprising concatenated sets of term representations of the plurality of sets of term representations, for example). In an example, the first user intention-based representation may comprise a vector representation (e.g., an embedding and/or an embedding-based representation), such as a sentence embedding (e.g., an unordered sentence representation) generated based upon the term representation data structure 532. FIG. 5E illustrates the first user intention-based representation (shown with reference number 536) being generated. In an example, the term representation data structure 532 may be input to a representation generation module 534. The representation generation module 534 may generate the first user intention-based representation 536 based upon the term representation data structure 532.

In some examples, one or more operations (e.g., mathematical operations) are performed using term representations, of the term representation data structure 532, to generate the first user intention-based representation 536. In an example, term representations of the term representation data structure 532 may be averaged to generate the first user intention-based representation 536.

Alternatively and/or additionally, the first user intention-based representation 536 may be generated based upon a plurality of weights associated with the term representations of the term representation data structure 532. For example, the term representations may be combined (e.g., averaged) based upon the plurality of weights to generate the first user intention-based representation 536. In an example, the first user intention-based representation 536 may be based upon a combination (e.g., a weighted average), of the term representations of the term representation data structure 532, determined based upon the plurality of weights (e.g., weighted averaging using the plurality of weights may be performed based upon the term representations of the term representation data structure 532 to generate the combination).

In some examples, the plurality of weights may be based upon a plurality of metrics associated the term representations of the term representation data structure 532. In an example, each metric of the plurality of metrics is associated with a term representation of the term representation data structure 532 and corresponds to a measure (e.g., a quantity and/or frequency) of instances of a term, associated with the term representation, in a set of text. For example, the plurality of weights may comprise a first weight associated with a first term representation associated with the term "theme" (e.g., the first term representation is a representation, of the plurality of term representations, of the term "theme") and a second weight associated with a second term representation associated with the term "park" (e.g., the second term representation is a representation, of the plurality of term representations, of the term "park"). The first weight may be determined based upon a first metric of the plurality of metrics. The first metric may correspond to a measure of instances of the term "theme" in the set of text. For example, the first metric may correspond to a quantity of instances of the term "theme" in the set of text, such as at least one of a quantity of times the term "theme" is referred to in the set of text, a quantity of sentences in the set of text that comprise the term "theme", etc. Alternatively and/or additionally, the second weight may be determined based upon a second metric of the plurality of metrics. The second metric may correspond to a measure of instances of the term "park" in the set of text. In some examples, the set of text may comprise at least one of the second plurality of search queries, a text corpus, one or more articles, one or more encyclopedias, etc. In some examples, the first weight is determined based upon the first metric and/or the second weight is determined based upon the second metric. In an example, the first weight may be a function of the first metric. Alternatively and/or additionally, the second weight may be a function of the second metric. In some examples, term representations may be down-weighted proportional to term frequencies of terms associated with the term representations. In an example, a decrease of the first metric results in an increase of the first weight and/or a decrease of the second metric may result in an increase of the second weight. Other weights of the plurality of weights (other than the first weight and the second weight) may be determined using one or more of the techniques provided herein with respect to determining the first weight and the second weight. In some examples, determining the plurality of weights using one or more of the techniques provided herein (such as where a decrease of a metric of the plurality of metrics results in an increase of a weight determined based upon the metric) may result in more frequently used terms being de-emphasized and/or less frequently used terms being emphasized, wherein the less frequently used terms may carry more semantic content than the more frequently used terms, thereby increasing an isotropy of the combination and/or the first user intention-based representation 536 (such that the first user intention-based representation 536 is a contextualized representation, for example).

In some examples, one or more operations may be performed on the combination (e.g., the weighted average) of the term representations of the term representation data structure 532 to generate the first user intention-based representation 536. For example, the one or more operations may be performed to remove noise of the combination (e.g., smoothen the combination) to generate the first user intention-based representation 536. In some examples, one, some and/or all operations of the one or more operations may be performed using a smoothed inverse frequency (SIF) model and/or a different model. The noise of the combination may be introduced to the combination by a set of noise-introducing terms in the first plurality of search queries. In an example, the set of noise-introducing terms may comprise at least one of one or more dataset-specific terms in the first plurality of search queries, one or more frequent terms in the first plurality of search queries (e.g., a quantity of instances of a frequent term of the one or more frequent terms may exceed a threshold), one or more syntactical features in the first plurality of search queries, one or more stop-words (e.g., at least one of "a", "the", "is", etc.) in the first plurality of search queries, etc. The noise-introducing set of terms may add noise to the combination due to the additive property of term representations of the plurality of term representations. In an example, the noise-introducing set of terms may amplify one or more signals of the combination in one or more dominant directions and/or may diminish one or more signals (e.g., useful signals) in one or more trailing directions. In some examples, principal component analysis may be performed on the combination to identify one or more principal components of the combination, such as a top n principal components of the combination. In an example, n may be in the range of at least 1 to at most 10 (e.g., n may be equal to 5). In some examples, the one or more operations may comprise removing the one or more principal components from the combination. Alternatively and/or additionally, the one or more operations may comprise subtracting one or more weighted vector projections, associated with the one or more principal components, from the combination. In some examples, a weight applied to a weighted vector projection of the one or more weighted vector projections may be a value (e.g., a singular value) that accounts for a variance of the one or more principal components. For example, the first user intention-based representation 536 may be generated by removing the one or more principal components from the combination and by subtracting the one or more weighted vector projections from the combination. In some examples, performing the one or more operations de-emphasizes more frequently used terms and/or emphasizes less frequently used terms, wherein the less frequently used terms may carry more semantic content than the more frequently used terms, thereby increasing an isotropy of the first user intention-based representation 536.

In some examples, a plurality of user intention-based representations associated with a plurality of internet resource identification items may be generated. For example, the plurality of user intention-based representations may comprise the first user intention-based representation 536 and/or the plurality of internet resource identification items may comprise the first internet resource identification item 524. In an example, each internet resource identification item of the plurality of internet resource identification items may be associated with one or more internet resources (such as discussed herein with respect to the first internet resource identification item 524 associated with the one or more first internet resources). In some examples, the plurality of user intention-based representations may comprise the first user intention-based representation 536 associated with the first internet resource identification item 524, a second user intention-based representation associated with a second internet resource identification item (of the plurality of internet resource identification items), etc. Other user intention-based representations of the plurality of user intention-based representations (other than the first user intention-based representation 536) may be generated using one or more of the techniques provided herein with respect to generating the first user intention-based representation 536.

In some examples, the plurality of internet resource identification items may comprise multiple internet resource identification items that are variants of a domain. For example, the multiple internet resource identification items may comprise at least one of differing domain suffixes, differing domain prefixes, differing subdomains, differing paths, etc. In an example, variants of the domain may be canonicalized to determine the multiple internet resource identification items. In an example, the domain may comprise "shoppingcenterforall". The multiple internet resource identification items may comprise differing subdomains, such as a subdomain "careers" and/or a subdomain "shop". For example, the multiple internet resource identification items may comprise an internet resource identification item "careers.shoppingcenterforall.com" with the subdomain "careers", and/or an internet resource identification item "shop.shoppingcenterforall.com" with the subdomain "shop". The multiple internet resource identification items may comprise differing suffixes and/or prefixes associated with at least one of different regions (e.g., "uk" for the United Kingdom, "ca" for Canada, etc.), different languages (e.g., "en" for English, "fr" for French, etc.), etc. For example, the multiple internet resource identification items may comprise at least one of an internet resource identification item "en.shoppingcenterforall.com" with the prefix "en" for English, an internet resource identification item "fr.shoppingcenterforall.com" with the prefix "fr" for French, etc. The multiple internet resource identification items may comprise differing paths associated with different parts of a website. For example, the multiple internet resource identification items may comprise at least one of an internet resource identification item "www.shoppingcenterforall.com/electronics" associated with shopping for electronics, an internet resource identification item "www.shoppingcenterforall.com/clothing" associated with shopping for clothing, etc.

In some examples, an instance of "www" in a web address (e.g., the instance of "www" in "www.shoppingcenterforall.com") may not be considered to be a subdomain. For example, the instance of "www" may be considered to be a part of a URL string. In an example, whether or not a web address comprises "www" may not affect a determination of which internet resource identification item is associated with the web address. In an example, it may be determined that a web address "shoppingcenterforall.com" and a web address "www.shoppingcenterforall.com" are both associated with the same internet resource identification item "shoppingcenterforall.com". Alternatively and/or additionally, a part of a web address that contains qualifying information about the web address (e.g., "careers" in "careers.shoppingcenterforall.com", "shop" in "shop.shoppingcenterforall.com", etc.) may be considered to be a subdomain.

In some examples, search queries associated with a third internet resource identification item of the multiple internet resource identification items may be supplemented with search queries associated with one or more other internet resource identification items of the multiple internet resource identifications. For example, a third plurality of search queries associated with the third internet resource identification item may be determined (using one or more of the techniques provided herein with respect to determining the first plurality of search queries and/or the second plurality of search queries, for example). A fourth plurality of search queries associated with a fourth internet resource identification item of the multiple internet resource identification items may be determined (using one or more of the techniques provided herein with respect to determining the first plurality of search queries and/or the second plurality of search queries, for example). In some examples, the third plurality of search queries may be supplemented with the fourth plurality of search queries such that a user intention-based representation associated with the third internet resource identification item is determined based upon a fifth plurality of search queries comprising the third plurality of search queries and the fourth plurality of search queries. In some examples, the third plurality of search queries may be supplemented with the fourth plurality of search queries based upon a determination that internet resources associated with the third internet resource identification item and internet resources associated with the fourth internet resource identification item fall under a same category.

In a first example, the third internet resource identification item is "shoppingcenterforall.com" and the fourth internet resource identification item is "shop.shoppingcenterforall.com", wherein internet resources associated with the third internet resource identification item and internet resources associated with the fourth internet resource identification item are associated with an internet resource category "shopping" (e.g., both "shoppingcenterforall.com" and "shop.shoppingcenterforall.com" are used for shopping). In the first example, based upon the determination that internet resources associated with the third internet resource identification item and internet resources associated with the fourth internet resource identification item are associated with the internet resource category "shopping", the third plurality of search queries may be supplemented with the fourth plurality of search queries for determining the user intention-based representation associated with the third internet resource identification item.

In a second example, the third internet resource identification item is "shoppingcenterforall.com" and the fourth internet resource identification item is "careers.shoppingcenterforall.com", wherein internet resources associated with the third internet resource identification item are associated with an internet resource category "shopping" and internet resources associated with the fourth internet resource identification item are associated with a different internet resource category "job search". In the second example, based upon the determination that internet resources associated with the third internet resource identification item and internet resources associated with the fourth internet resource identification item are associated with different internet resource categories, the third plurality of search queries may not be supplemented with the fourth plurality of search queries for determining the user intention-based representation associated with the third internet resource identification item.

In a third example, the third internet resource identification item is "shoppingcenterforall.com/electronics" and the fourth internet resource identification item is "shoppingcenterforall.com/clothing", wherein internet resources associated with the third internet resource identification item are associated with an internet resource category "electronics shopping" and internet resources associated with the fourth internet resource identification item are associated with a different internet resource category "clothes shopping". In the third example, based upon the determination that internet resources associated with the third internet resource identification item and internet resources associated with the fourth internet resource identification item are associated with different internet resource categories, the third plurality of search queries may not be supplemented with the fourth plurality of search queries for determining the user intention-based representation associated with the third internet resource identification item.

In a fourth example, the third internet resource identification item is "shoppingcenterforall.com/electronics" and the fourth internet resource identification item is "electronicsstore.com", wherein internet resources associated with the third internet resource identification item and internet resources associated with the fourth internet resource identification item are associated with an internet resource category "shopping" (e.g., both "shoppingcenterforall.com/electronics" and "electronicsstore.com" are used for shopping). In the fourth example, based upon the determination that internet resources associated with the third internet resource identification item and internet resources associated with the fourth internet resource identification item are associated with the internet resource category "shopping", the third plurality of search queries may be supplemented with the fourth plurality of search queries for determining the user intention-based representation associated with the third internet resource identification item (even though the third internet resource identification item and the fourth internet resource identification item comprise different domains, for example).

In some examples, a similarity profile may be generated based upon the plurality of user intention-based representations. For example, the similarity profile may be indicative of similarity scores corresponding to levels of similarity between internet resource identification items of the plurality of internet resource identification items. In an example, a first similarity score of the similarity profile may correspond to a level of similarity between the first internet resource identification item 524 and the second internet resource identification item. The first similarity score may be based upon (e.g., may be equal to) a cosine similarity between the first user intention-based representation 536 associated with the first internet resource identification item 524 and the second user intention-based representation associated with the second internet resource identification item (e.g., the first user intention-based representation 536 may be a first vector representation, the second user intention-based representation may be a second vector representation, and/or the first similarity score may correspond to a cosine similarity between the first vector representation and the second vector representation).

In some examples, using one or more of the techniques provided herein, the plurality of user intention-based representations (e.g., the similarity profile generated based upon the plurality of user intention-based representations) may be used for at least one of categorization of internet resource identification items, information propagation among profiles associated with internet resource identification items, grouping internet resource identification items into groups, etc.

In an example, the plurality of internet resource identification items may be grouped into a plurality of groups based upon the plurality of user intention-based representations. In an example, the plurality of internet resource identification items may be grouped into the plurality of groups (based upon the plurality of user intention-based representations) using one or more clustering techniques, such as one or more k-means clustering techniques and/or one or more other clustering techniques. Alternatively and/or additionally, the plurality of internet resource identification items may be grouped into the plurality of groups based upon the similarity scores of the similarity profile. For example, internet resource identification items may be grouped together in a first group of the plurality of groups based upon a determination that similarity scores corresponding to levels of similarity between user intention-based representations associated with the internet resource identification items exceed a first threshold similarity score. Alternatively and/or additionally, the internet resource identification items may be grouped together in the first group based upon a determination that the user intention-based representations associated with the internet resource identification items are top-m nearest neighbors, wherein m may be an integer (e.g., the determination that the user intention-based representations are the top-m nearest neighbors may be based upon the similarity scores corresponding to the levels of similarity between the user intention-based representations).

In some examples, information propagation among profiles associated with internet resource identification items of the plurality of internet resource identification items may be performed based upon the plurality of groups. In an example, information (e.g., a category, a label, manually curated information, etc.) in a profile associated with an internet resource identification item of a group of the plurality of groups may be propagated to one or more profiles of one or more other internet resource identification items in the group based upon the internet resource identification item and the one or more other internet resource identification items belonging to the same group.

In an example, the first group may comprise the first internet resource identification item 524, the second internet resource identification item and/or one or more other internet resource identification items. First information (e.g., one or more characteristics, one or more labels, manually curated information, etc.) associated with the second internet resource identification item may be determined. In an example, the first information may comprise one or more first characteristics associated with the second internet resource identification item, such as one or more characteristics of internet resources associated with the second internet resource identification item. For example, the one or more first characteristics may comprise one or more characteristics of content of internet resources associated with the second internet resource identification item. In an example, the one or more characteristics may comprise one or more types of content provided by internet resources associated with the second internet resource identification item (e.g., the one or more characteristics may comprise at least one of "educational content", "news", "videos", "music", etc.) and/or one or more topics of content provided by internet resources associated with the second internet resource identification item (e.g., the one or more characteristics may comprise at least one of "cars", "accounting", "real estate", etc.). Alternatively and/or additionally, the one or more first characteristics may comprise one or more characteristics associated with one or more functionalities of internet resources associated with the second internet resource identification item (e.g., the one or more characteristics may comprise at least one of "shopping", "searching", etc.). In some examples, the one or more first characteristics may correspond to labels from one or more first taxonomies, such as Interactive Advertising Bureau (IAB) taxonomy and/or one or more other taxonomies. In an example, the second internet resource identification item may correspond to a domain name of a web site comprising educational information for preparing for a real estate certification exam. In the example, the one or more first characteristics may comprise at least one of "educational content", "real estate", "exam preparation", etc. In some examples, the one or more first characteristics may correspond to one or more intention labels associated with the second internet resource identification item. For example, the one or more first characteristics may be indicative of one or more intentions and/or one or more interests of a user that accesses an internet resource associated with the second internet resource identification item. In the example, based upon the one or more first characteristics, it may be determined that an intention of a user for accessing an internet resource associated with the second internet resource identification item is to access educational content associated with real estate and/or to prepare for a real estate exam (and/or it may be determined that a user that accesses an internet resource associated with the second internet resource identification item is interested in educational content associated with real estate and/or is interested in preparing for a real estate exam).

In some examples, the first information may be propagated to (e.g., included in) a first profile associated with the first internet resource identification item 524 based upon the first internet resource identification item 524 and the second internet resource identification item belonging to the first group of the plurality of groups. For example, the first information may be propagated from a second profile associated with the second internet resource identification item to the first profile and/or one or more other profiles associated with one or more other internet resource identification items that belong to the first group. For example, the first profile associated with the first internet resource identification item 524 may be generated based upon the first information (e.g., the first information may be included in the first profile). In some examples, at least some of the first information (e.g., one, some and/or all of the one or more first characteristics) may be determined using manual effort (e.g., at least some of the first information may be produced by a labeling agent) and/or using one or more other techniques. Alternatively and/or additionally, one or more internet resources associated with the second internet resource identification item may be analyzed to automatically determine at least some of the first information (e.g., one, some and/or all of the one or more first characteristics), such as based upon content in the one or more internet resources (e.g., the content may be analyzed using at least one of one or more natural language processing (NLP) techniques, one or more image analysis techniques, etc. to determine at least some of the first information). Propagating the first information to other profiles associated with other internet resource identification items of the first group provides for determining profile information for internet resource identification items of the first group with at least one of less manual effort, fewer computations, increased speed, etc., such as due to not requiring that profile information (e.g., information to be included in a profile associated with an internet resource identification item) be determined separately for each internet resource identification item of the first group.

Alternatively and/or additionally, a plurality of sets of information associated with a subset of internet resource identification items of the plurality of internet resource identification items may be determined. For example, the subset of internet resource identification items may correspond to a seed set of internet resource identification items, of the plurality of internet resource identification items, for which information (e.g., one or more characteristics) is determined, wherein at least some of the information is propagated to profiles of internet resource identification items (other than the subset of internet resource identification items, for example) of the plurality of internet resource identification items. In an example, at least some information of one, some and/or all sets of information of the plurality of sets of information may be manually curated. In some examples, for each internet resource identification item of the subset of internet resource identification items, the plurality of sets of information may comprise a set of information associated with the internet resource identification item, wherein the set of information may comprise one or more characteristics associated with the internet resource identification item (e.g., one or more characteristics of internet resources associated with the internet resource identification item, such as comprising at least one of one or more characteristics of content associated with the internet resource identification item, one or more types of content associated with the internet resource identification item, one or more topics of content associated with the internet resource identification item, one or more characteristics associated with one or more functionalities of internet resources associated with the internet resource identification item, one or more labels from the one or more first taxonomies, one or more intention labels, etc.). In an example, the subset of internet resource identification items may comprise the second internet resource identification item, a third internet resource identification item, etc. The plurality of sets of information may comprise a first set of information (e.g., the first information discussed above) associated with the second internet resource identification item, a second set of information associated with the third internet resource identification item, etc. The plurality of sets of information may be determined using one or more of the techniques provided herein with respect to determining the first information.

In some examples, sets of information of the plurality of sets of information may be propagated to profiles associated with internet resource identification items of the plurality of internet resource identification items based upon the similarity profile, such as based upon similarity scores of the similarity profile.

In an example, the first set of information associated with the second internet resource identification item is propagated to profiles associated with a relevant set of internet resource identification items. The relevant set of internet resource identification items correspond to internet resource identification items that are determined to be relevant to the first set of information and/or the second internet resource identification item. In an example, an internet resource identification item may be selected for inclusion in the relevant set of internet resource identification items based upon a determination that a similarity score (as indicated by the similarity profile, for example), corresponding to a level of similarity between the internet resource identification item and the second internet resource identification item, meets (e.g., is equal to or exceeds) a second threshold similarity score. For example, the first internet resource identification item 524 may be included in the relevant set of internet resource identification items based upon a determination that the first similarity score (corresponding to the level of similarity between the first internet resource identification item 524 and the second internet resource identification item) meets (e.g., is equal to or exceeds) the second threshold similarity score.

Figure 5F:
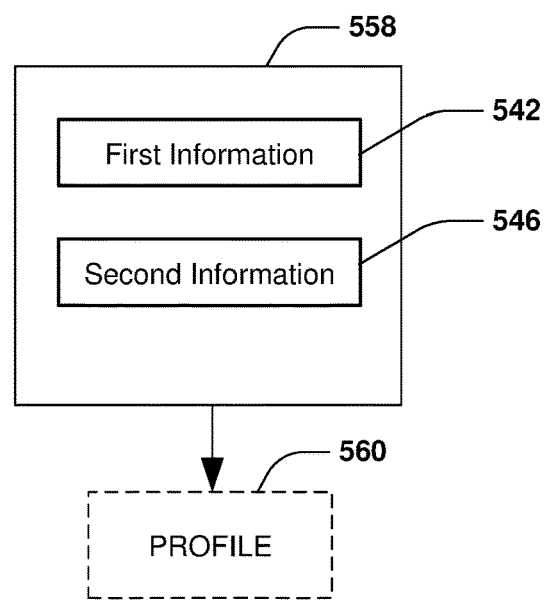
FIG. 5F is a component block diagram illustrating an example system for determining user intention-based representations associated with internet resource identification items and/or selecting content for transmission to devices, where one or more sets of information are included in the first profile.

In some examples, the first profile associated with the first internet resource identification item 524 may be generated based upon the plurality of sets of information and similarity scores, of the similarity profile, corresponding to levels of similarity between the first internet resource identification item 524 and internet resource identification items of the subset of internet resource identification items. For example, one or more sets of information, of the plurality of sets of information, may be selected for inclusion in the first profile associated with the first internet resource identification item 524. FIG. 5F illustrates the one or more sets of information (shown with reference number 558) being included in the first profile (shown with reference number 560) associated with the first internet resource identification item 524. In an example, the one or more sets of information 558 may comprise the first set of information (shown with reference number 542) associated with the second internet resource identification item and/or the second set of information (shown with reference number 546) associated with the third internet resource identification item. For example, the first set of information 542 may be selected for inclusion in the first profile 560 associated with the first internet resource identification item 524 based upon a determination that the first similarity score (corresponding to the level of similarity between the first internet resource identification item 524 and the second internet resource identification item) meets (e.g., is equal to or exceeds) the second threshold similarity score. Alternatively and/or additionally, the second set of information 546 associated with the third internet resource identification item may be selected for inclusion in the first profile 560 based upon a determination that a similarity score (corresponding to a level of similarity between the first internet resource identification item 524 and the third internet resource identification item) meets (e.g., is equal to or exceeds) the second threshold similarity score.

In some examples, a plurality of profiles associated with the plurality of internet resource identification items may be generated. For example, the plurality of profiles may comprise the first profile 560, the second profile associated with the second internet resource identification item, etc. Other profiles of the plurality of profiles (other than the first profile 560) may be generated using one or more of the techniques provided herein with respect to generating the first profile 560. In an example, information of the plurality of sets of information associated with the subset of internet resource identification items may be propagated to profiles of the plurality of profiles (such as using one or more of the techniques provided herein with respect to the first profile 560). In some examples, profiles of the plurality of profiles may be used for content item selection (such as discussed herein with respect to using the first profile 560 to select a first content item for presentation via the first client device 500).

In some examples, at least some of the plurality of profiles may be used as training data for labeling internet resource identification items of the plurality of internet resource identification items with a set of labels. For example, labels of the set of labels may be added to profiles of the plurality of profile. In an example, the set of labels may correspond to labels from one or more second taxonomies different than the one or more first taxonomies. For example, labels of the plurality of profiles (e.g., labels from the one or more first taxonomies) may be mapped to the set of labels from the one or more second taxonomies. In some examples, a subset of profiles, of the plurality of profiles, may be used to label the internet resource identification items with the set of labels. The subset of profiles may comprise profiles that are determined to meet a threshold quality, such as profiles comprising one or more labels (indicative of characteristics, such as the one or more first characteristics) that have label confidence scores that meet (e.g., are equal to or exceed) a threshold label confidence score. Alternatively and/or additionally, the subset of profiles may comprise profiles associated with internet resource identification items, of the plurality of internet resource identification items, that are associated with at least a threshold amount of user activity (e.g., an internet resource identification item may be determined to be associated with at least the threshold amount of user activity if a measure of events in which internet resources associated with the internet resource identification item are accessed exceeds a threshold measure of events).

At 410, a first content item may be selected for presentation via the first client device 500 based upon the first user intention-based representation 536. In some examples, the first content item may be selected and/or presented by a content system. The content system may be an advertisement system (e.g., an online advertising system). Alternatively and/or additionally, the content system may not be an advertisement system. In some examples, the content system may provide content items (e.g., advertisements, images, links, videos, etc.) to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to consume and/or interact with the content item before the user can access content of a web page, utilize resources of an application and/or play a game.

For example, the first content item may be selected for presentation via the first client device 500 based upon the first profile 560 (that is determined based upon the first user intention-based representation 536). For example, the first profile 560 may be used to select the first content item for presentation via the first client device 500 based upon a determination that the first client device 500 is associated with an event (e.g., the first event shown in and/or described with respect to FIGS. 5A-5C) in which an internet resource (e.g., the fourth web page 520) of the one or more first internet resources associated with the first internet resource identification item 524 is accessed. In an example, the first event in which the fourth web page 520 is accessed may be identified using a user profile, associated with the first client device 500, indicative of internet resources accessed by the first client device 500 (e.g., the user profile may comprise an indication of the fourth web page 520 having been accessed by the first client device 500). In an example, the user profile associated with the first client device 500 may be used by the content system to select content items (e.g., advertisements and/or other type of content) for presentation via the first client device 500.

In some examples, the first content item may be selected based upon first targeting information associated with the first content item and the first profile 560 associated with the first internet resource identification item 524. In an example, the first targeting information may be indicative of information associated with a target audience of the first content item. In some examples, the first targeting information may be received from a second client device associated with a first entity associated with the first content item. In an example, the first entity may be an advertiser, a company, a brand, an organization, etc. and/or the first content item may be an advertisement that promotes the first entity and/or promotes one or more products and/or services provided by the first entity. The first targeting information may be received via a targeting interface displayed via the second client device. For example, the targeting interface may comprise selectable inputs and/or text fields, wherein the first targeting information may be received via selections of the selectable inputs and/or text input via the text fields. In some examples, the first targeting information may be used to determine whether or not a user is within the target audience of the first content item.

In some examples, the first targeting information may comprise one or more second characteristics associated with the target audience of the first content item. The one or more second characteristics may comprise one or more user activity characteristics of associated with the target audience (e.g., one or more characteristics of user activity of users that belong to the target audience). For example, the one or more user activity characteristics may comprise at least one of one or more types of content accessed by users of the target audience (e.g., the one or more types of content may comprise at least one of "educational content", "news", "videos", "music", etc.), one or more topics of content accessed by users of the target audience (e.g., the one or more topics of content may comprise at least one of "cars", "accounting", "real estate", etc.), one or more internet resource functionalities of internet resources accessed by users of the target audience (e.g., the one or more internet resource functionalities may comprise at least one of "shopping", "searching", etc.), one or more internet resources accessed by users of the target audience, etc. In some examples, the one or more second characteristics may correspond to labels from one or more third taxonomies, such as IAB taxonomy and/or one or more other taxonomies. In an example, the one or more third taxonomies may be the same as the one or more first taxonomies. In some examples, the one or more second characteristics may correspond to one or more intention labels associated with the target audience.

In some examples, whether or not the first client device 500 is part of the target audience of the first content item may be determined based upon the user profile associated with the first client device 500 and the first targeting information. For example, the user profile and/or the first targeting information may be analyzed to identify one or more matching characteristics, such as one or more characteristics of user activity of the first client device 500 that match one or more characteristics of user activity associated with the target audience. In some examples, the one or more matching characteristics may be determined based upon one or more profiles associated with one or more internet resources accessed by the first client device 500 (as indicated by the user profile associated with the first client device 500, for example). For example, based upon the user profile being indicative of the first client device 500 having accessed the fourth web page 520 associated with the first internet resource identification item 524, the one or more profiles may comprise the first profile 560 associated with the first internet resource identification item 524.

In an example, the first profile 560 comprises the first set of information 542 associated with the second internet resource identification item (such as shown in and/or described with respect to FIG. 5F). The first set of information 542 of the first profile 560 may be compared with the first targeting information to determine the one or more matching characteristics. In an example, the first set of information 542 may comprise one or more characteristics of content provided by internet resources associated with the second internet resource identification item, wherein the one or more characteristics comprise content topics comprising "theme park", "tourism", "traveling" and "entertainment". The one or more second characteristics of the first targeting information may comprise content topics comprising "theme park", "traveling", "hotels" and "entertainment". Accordingly, the one or more matching characteristics may be determined to comprise content topics comprising "theme park", "traveling" and "entertainment" (e.g., the first content item may be an advertisement for a theme park). In an example, it may be determined that the first client device 500 is part of the target audience of the first content item based upon the one or more matching characteristics. In an example, based upon the profile 560 and the first event in which the first client device 500 accesses the fourth web page associated with the first internet resource identification item 524, it may be determined that a user of the first client device 500 has an interest in content topics (e.g., "theme park", "traveling" and "entertainment") associated with the target audience of the first content item.

Alternatively and/or additionally, the first targeting information may be indicative of one or more second internet resources associated with the target audience (e.g., one or more second internet resources accessed by users of the target audience). In an example, whether or not the fourth web page 520 accessed by the first client device 500 (in the first event, for example) matches a second internet resource of the one or more second internet resources may be determined based upon the similarity profile and/or the plurality of groups of internet resource identification items. For example, the fourth web page 520 may be determined to match the second internet resource based upon a determination that the first internet resource identification item 524 associated with the fourth web page 520 and an internet resource identification item associated with the second internet resource are in the same group of the plurality of groups. For example, the plurality of internet resource identification items may comprise the internet resource identification item associated with the second internet resource (e.g., the internet resource identification item associated with the second internet resource may comprise a domain name of the second internet resource and/or at least a portion of a web address of the second internet resource). Alternatively and/or additionally, the fourth web page 520 may be determined to match the second internet resource based upon a determination that a similarity score (indicated by the similarity profile) corresponding to a level of similarity between the first internet resource identification item 524 associated with the fourth web page 520 and the internet resource identification item associated with the second internet resource meets (e.g., is equal to or exceeds) a third threshold similarity score. In some examples, it may be determined that the first client device 500 is part of the target audience of the first content item 500 based upon a determination that the fourth web page 520 accessed by the first client device 500 matches the second internet resource of the one or more second internet resources. In some examples, the one or more matching characteristics may comprise the fourth web page 520 and/or the second internet resource based upon a determination that the fourth web page 520 accessed by the first client device 500 matches the second internet resource of the one or more second internet resources.

Whether or not the first client device 500 is part of the target audience of the first content item may be determined based upon the one or more matching characteristics, such as based upon a quantity of characteristics of the one or more matching characteristics. In an example, the first client device 500 may be determined to be part of the target audience of the first content item based upon a determination that the quantity of characteristics of the one or more matching characteristics meets (e.g., is equal to or exceeds) a threshold quantity of characteristics. Alternatively and/or additionally, the first client device 500 may be determined to not be part of the target audience of the first content item based upon a determination that the quantity of characteristics of the one or more matching characteristics does not meet (e.g., is less than) the threshold quantity of characteristics. In an example, the threshold quantity of characteristics may be one (e.g., the first client device 500 may be determined to be part of the target audience of the first content item based upon identification of merely one matching characteristic between user activity of the first client device 500 and user activity of the target audience as indicated by the first targeting information). Alternatively and/or additionally, the threshold quantity of characteristics may be a value other than (e.g., greater than) one.

In some examples, the first content item may comprise at least one of an article, a video, an audio file, an image, a web page, an advertisement, an email, a message, a content suggestion, etc. In response to selecting the first content item for presentation via the first client device 500, the first content item may be transmitted to the first client device 500. The first content item may be displayed via the first client device 500. Alternatively and/or additionally, in an example where the first content item comprises audio, the audio may be played via the first client device 500 (e.g., the audio may be output via a speaker associated with the first client device 500).

In some examples, the first content item may be selected for presentation via the first client device 500 in response to receiving a first request for content. The first request for content may be received in response to the first client device 500 accessing a second internet resource associated with the content system. For example, the first client device 500 may transmit a request to access the second internet resource to a server associated with the second internet resource. In response to receiving the request to access the second internet resource, the server associated with the second internet resource may transmit the first request for content to the content system (and/or to a server associated with the content system). Alternatively and/or additionally, the first request for content may be received from the first client device 500. In some examples, the first request for content may correspond to a request to be provided with a content item (e.g., an advertisement, an image, a link, a video, etc.) for presentation via the second internet resource.

Figure 5G:
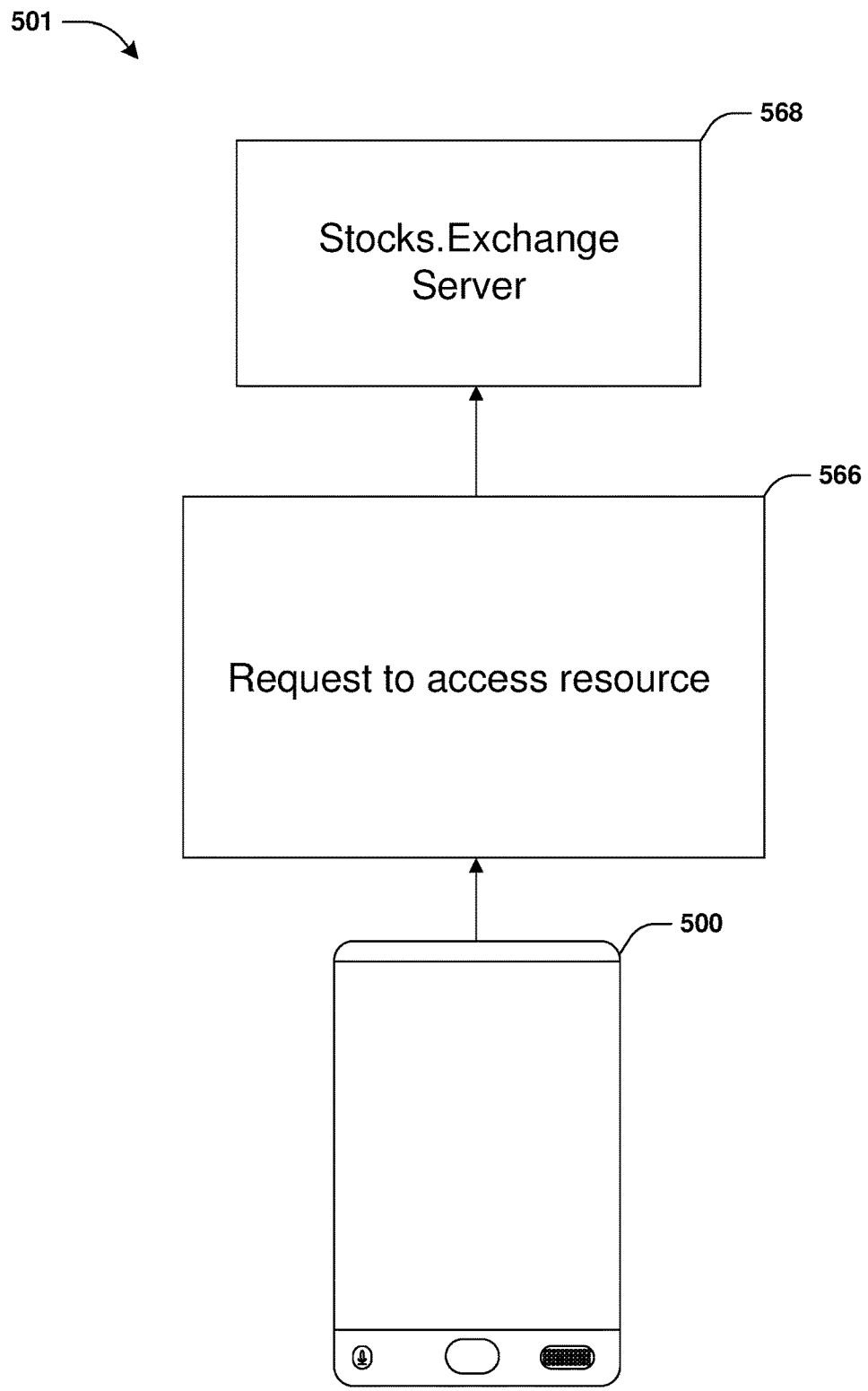
FIG. 5G is a component block diagram illustrating an example system for determining user intention-based representations associated with internet resource identification items and/or selecting content for transmission to devices, where a first client device transmits a request to access a resource to a server.
Figure 5H:
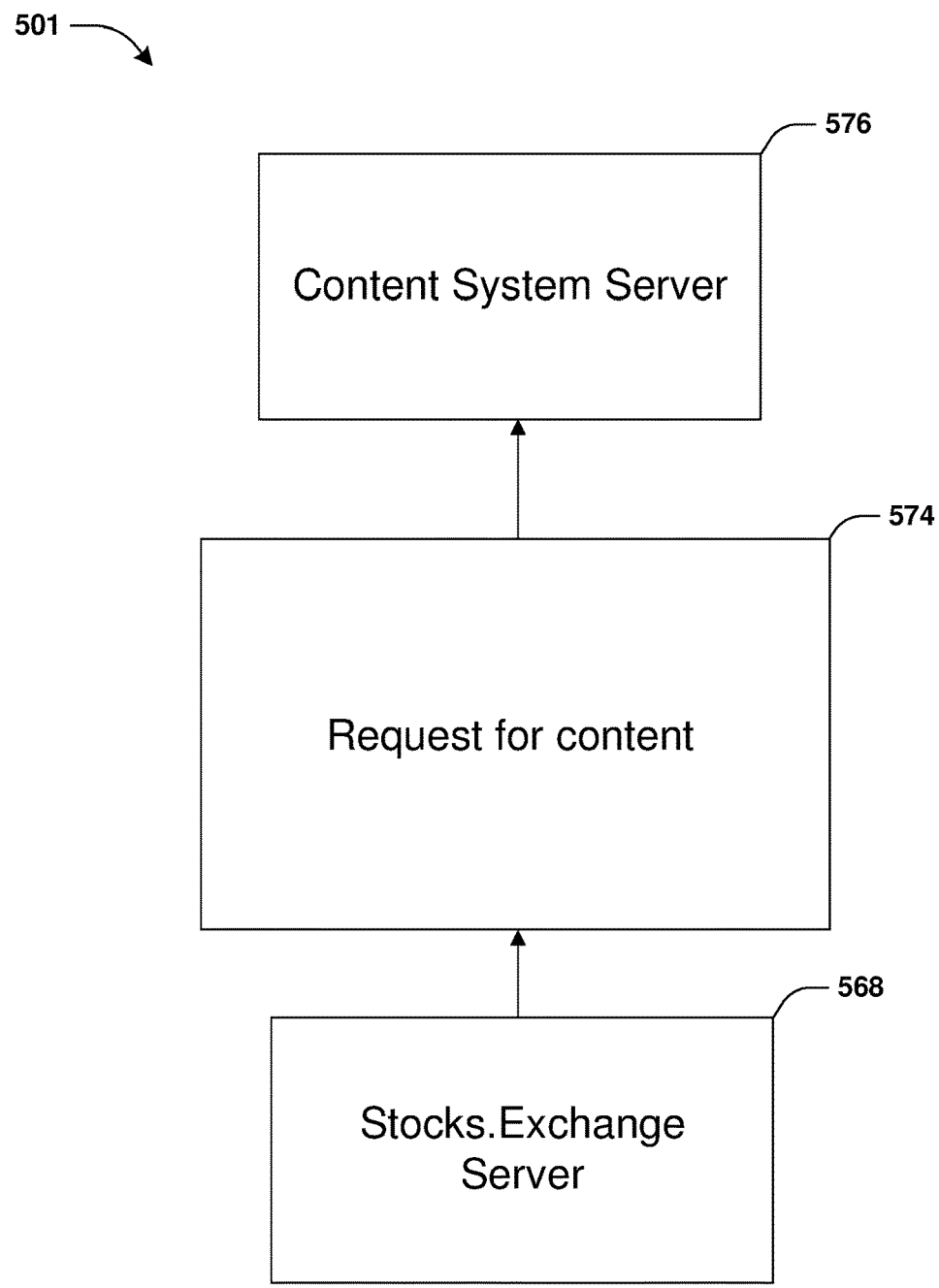
FIG. 5H is a component block diagram illustrating an example system for determining user intention-based representations associated with internet resource identification items and/or selecting content for transmission to devices, where a first server transmits a first request for content to a second server associated with a content system.
Figure 5I:
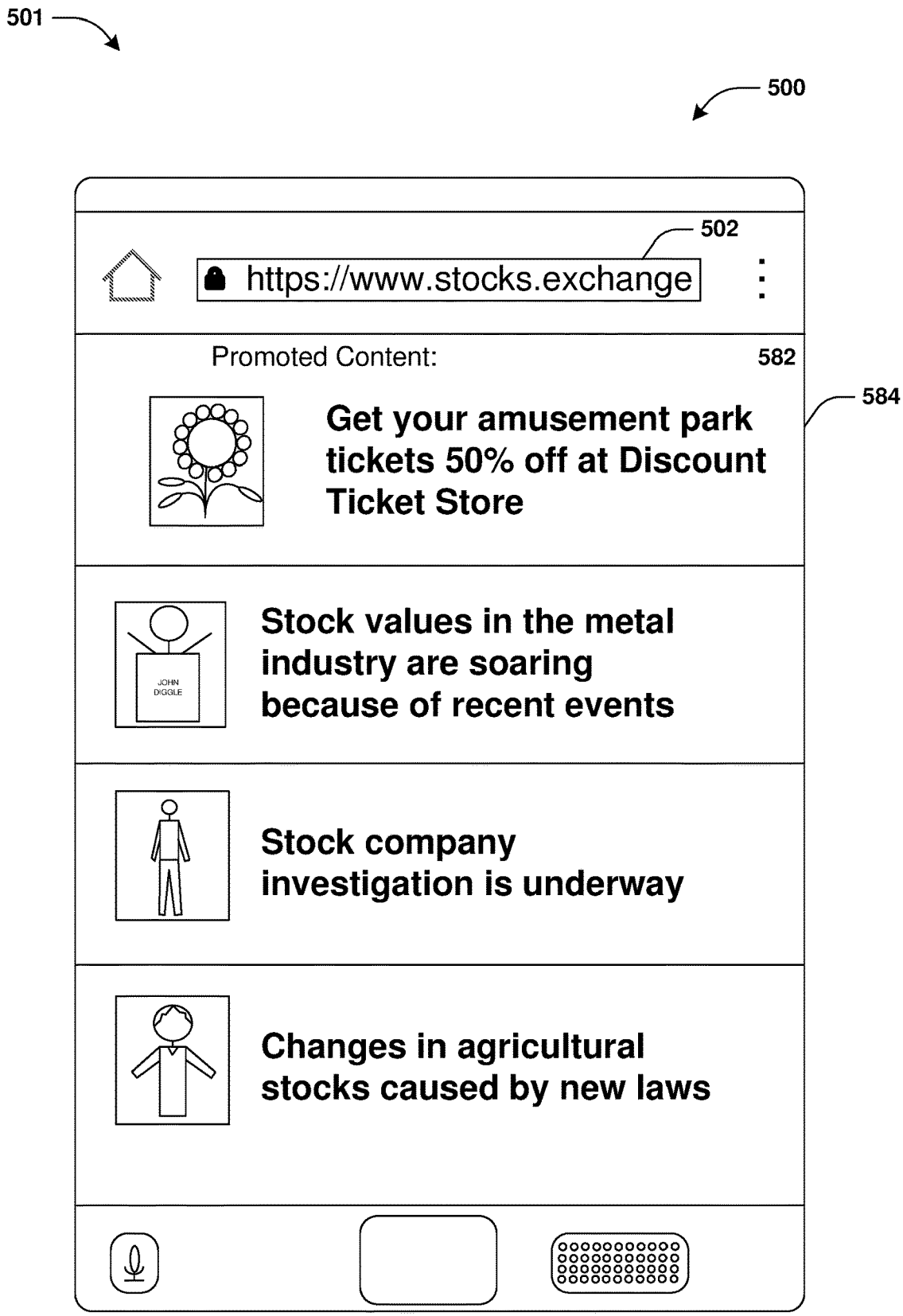
FIG. 5I is a component block diagram illustrating an example system for determining user intention-based representations associated with internet resource identification items and/or selecting content for transmission to devices, where a first client device presents and/or accesses a seventh web page.

FIGS. 5G-5I illustrate an exemplary scenario in which the first content item (shown with reference number 584 in FIG. 5I) is selected and/or presented via the first client device 500. FIG. 5G illustrates the first client device 500 transmitting a request 566 to access a resource to a first server 568. In some examples, the request 566 to access the resource may be transmitted in response to a selection of a selectable input (such as a link) corresponding to a seventh web page 582 (shown in FIG. 5I). For example, the resource may correspond to the seventh web page 582. The request 566 to access the resource may comprise an indication of the seventh web page 582 (e.g., a web address "https://stocks.exchange.com" of the seventh web page 582). Alternatively and/or additionally, the first server 568 may be associated with the seventh web page 582.

FIG. 5H illustrates the first server 568 transmitting the first request for content (shown with reference number 574) to a second server 576 associated with the content system. In some examples, the first request for content 574 may be transmitted (by the first server 568) in response to receiving the request 566 to access the resource. Alternatively and/or additionally, the first request for content 574 may be transmitted (to the second server 538) by the first client device 500. In some examples, the first request for content 574 may be a request to be provided with a content item (e.g., an advertisement, an image, a link, a video, etc.) for presentation via the seventh web page 582.

In some examples, in response to receiving the first request for content 574, the first content item 584 may be selected based upon a determination that the first client device 500 is part of the target audience of the first content item 584, such as using one or more of the techniques presented herein. In response to selecting the first content item 584 for presentation via the first client device 500, the first content item 584 may be transmitted to the first client device 500 for presentation via the seventh web page 582. FIG. 5I illustrates the first client device 500 presenting and/or accessing the seventh web page 582 using the browser. For example, the content system may provide the first content item 584 to be presented via the seventh web page 582 while the seventh web page 582 is accessed by the first client device 500.

Figure 6:
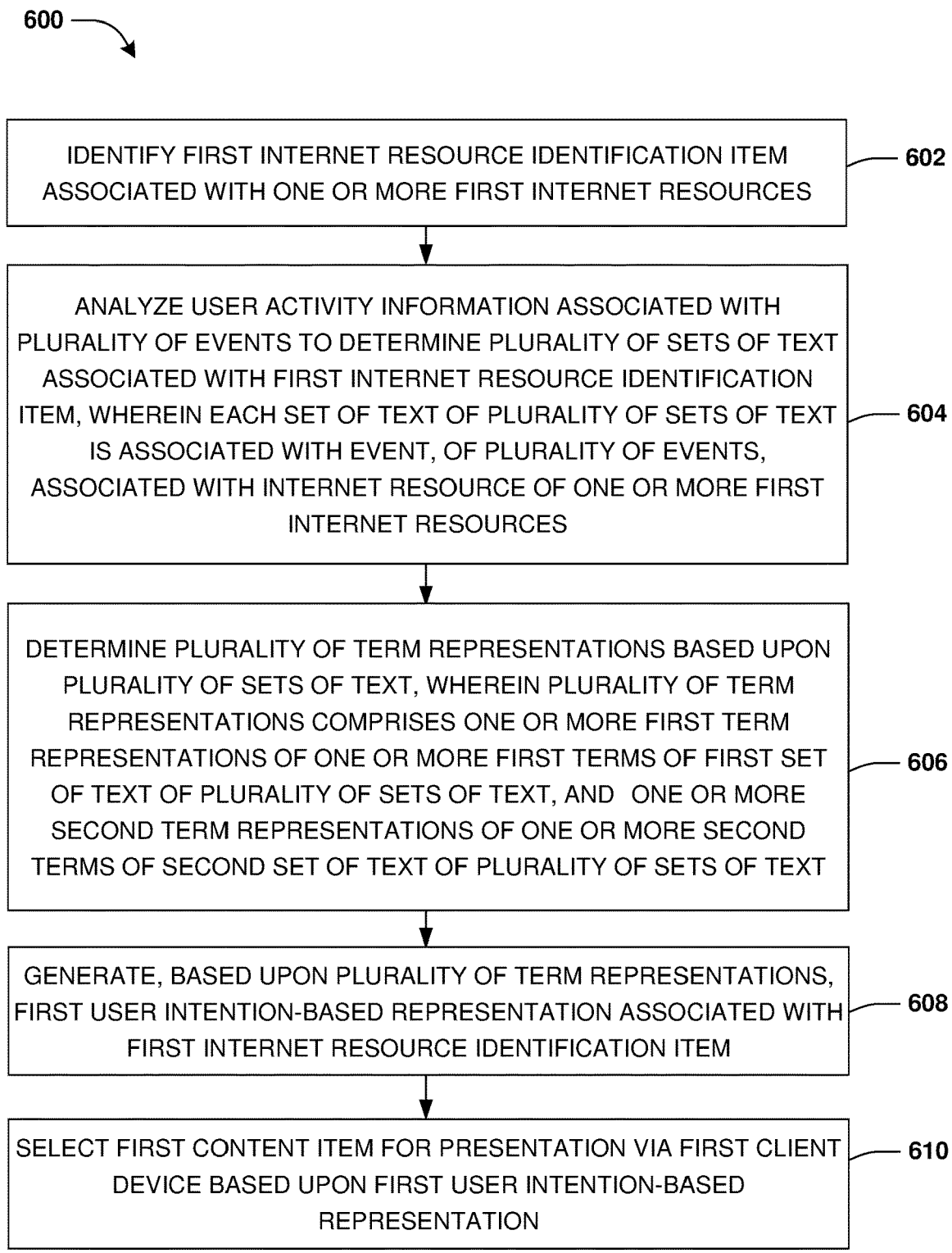
FIG. 6 is a flow chart illustrating an example method for determining user intention-based representations associated with internet resource identification items and/or selecting content for transmission to devices.

An embodiment of determining user intention-based representations associated with internet resource identification items and/or selecting content for transmission to devices is illustrated by an example method 600 of FIG. 6. In some examples, the example method 600 may comprise implementation of at least some of the techniques, features, etc. provided herein with respect to the example method 400 of FIG. 4 and/or the example system 501 of FIGS. 5A-5I. For example, at least some of the techniques, features, etc. provided herein with respect to search queries may be implemented with any type of set of text, such as at least one of search queries, product names, page titles, mail subjects, etc.

At 602, a first internet resource identification item associated with one or more first internet resources may be identified. In an example, the first internet resource identification item may comprise at least a portion of a domain name (e.g., a domain name of a website, an email address, etc.) associated with the one or more first internet resources and/or at least a portion of a web address (e.g., a uniform resource locator (URL)) associated with the one or more first internet resources. In an example, an internet resource of the one or more first internet resources may be a web page that has a web address comprising and/or matching the first internet resource identification item. In an example, the first internet resource identification item may be "floridastuff.com" (e.g., a domain name) and/or the one or more first internet resources may correspond to web pages that have web addresses comprising "floridastuff.com", such as at least one of "www.floridastuff.com/index.html", "www.floridastuff.com/fun-activities.html", etc. Alternatively and/or additionally, an internet resource of the one or more first internet resources may be an email sent by an email account that has an email address comprising and/or matching the first internet resource identification item. In an example, the first internet resource identification item may be "floridastuff.com" (e.g., a domain name) and/or the one or more first internet resources may correspond to emails that are sent by email accounts having email addresses comprising "floridastuff.com", such as at least one of "marketing@floridastuff.com", "customerservice@floridastuff.com", etc.

In an example, the one or more first internet resources may comprise at least one of one or more web pages, one or more websites, one or more applications, one or more articles, one or more videos, one or more audio files, one or more images, one or more web pages, one or more advertisements, one or more emails, one or more messages, etc.

At 604, user activity information associated with a plurality of events may be analyzed to determine a first plurality of sets of text associated with the first internet resource identification item. In some examples, the user activity information may be associated with a period of time (e.g., the plurality of events may be events that are performed within the period of time), such as a period of 6 months, a period of 12 months, a period of 13 months, or other period of time. In some examples, the user activity information may be determined via aggregating user activity of a plurality of users and/or a plurality of client devices (e.g., the plurality of events may comprise events associated with different users and/or different client devices). Each set of text of the first plurality of sets of text is associated with an event, of the plurality of events, associated with an internet resource of the one or more first internet resources (associated with the first internet resource identification item).

In an example, sets of text of the first plurality of sets of text comprise search queries (such as discussed herein with respect to the example method 400 of FIG. 4). For example, a search query of the first plurality of sets of text may be associated with an event, of the plurality of events, in which an internet resource of the one or more first internet resources is accessed via a selection of a search result from among search results generated based upon the search query.

In an example, sets of text of the first plurality of sets of text comprise product names. For example, a product name of the first plurality of sets of text may be associated with an event, of the plurality of events, in which an internet resource (e.g., a web page) of the one or more first internet resources is accessed by a client device. The product name may be determined based upon a web address of the internet resource (e.g., the web address may comprise an indication of the product name, wherein the product name may correspond to a name of a product that is sold on the internet resource). Alternatively and/or additionally, the product name may be determined by analyzing content of the internet resource to identify the product name in the content. In some examples, the event in which the internet resource is accessed (and/or the web address of the internet resource) may be determined based upon one or more received signals. The one or more received signals may comprise a request, from the client device, to access the internet resource. Alternatively and/or additionally, the one or more received signals may comprise a request for content. For example, the request for content may correspond to a request to provide a content item (e.g., an advertisement) for presentation via the internet resource on the client device. In an example, the request for content may comprise an indication of the web address, wherein the event and/or the product name may be determined based upon the web address. In an example, the request for content may be an advertisement request received (by the content system, for example) from at least one of a demand-side platform (DSP), an ad exchange, a data exchange, etc.

In an example, sets of text of the first plurality of sets of text comprise page titles. For example, a page title of the first plurality of sets of text may be associated with an event, of the plurality of events, in which an internet resource (e.g., a web page) of the one or more first internet resources is accessed by a client device. The page title may be determined based upon a web address of the internet resource (e.g., the web address may comprise an indication of the page title). Alternatively and/or additionally, the page title may be determined by analyzing content of the internet resource to identify the page title in the content. The page title may correspond to a title of content (e.g., a title of an article, a title of a video, etc.) that is provided on the internet resource. In some examples, the event in which the internet resource is accessed (and/or the web address of the internet resource) may be determined based upon one or more received signals. The one or more received signals may comprise a request, from the client device, to access the internet resource. Alternatively and/or additionally, the one or more received signals may comprise a request for content. For example, the request for content may correspond to a request to provide a content item (e.g., an advertisement) for presentation via the internet resource on the client device. In an example, the request for content may comprise an indication of the web address, wherein the event and/or the page title may be determined based upon the web address. In an example, the request for content may be an advertisement request received (by the content system, for example) from at least one of a DSP, an ad exchange, a data exchange, etc.

In an example, sets of text of the first plurality of sets of text comprise mail subjects. For example, a mail subject of the first plurality of sets of text may be associated with an event, of the plurality of events, in which an internet resource (e.g., an email) of the one or more first internet resources is transmitted by an email account having an email address that comprises the first internet resource identification item. The mail subject may correspond to an email subject of the internet resource (e.g., the email). The mail subject may be determined based upon a subject field of the email.

In some examples, the first plurality of sets of text comprises multiple types of sets of text, such as at least two of search queries, product names, page titles, mail subjects, etc.

In some examples, the first plurality of sets of text comprises merely one type of set of text, such as merely one of search queries, product names, page titles, mail subjects, etc.

In some examples, the first plurality of sets of text is a subset of sets of text of a second plurality of sets of text associated with the first internet resource identification item. For example, each set of text of the second plurality of sets of text is associated with an event, of the plurality of events, associated with an internet resource of the one or more first internet resources. The subset of sets of text may be selected from the second plurality of sets of text if a quantity of sets of text, of the second plurality of sets of text, exceeds a threshold quantity of sets of text k. Alternatively and/or additionally, if the quantity of sets of text of the second plurality of sets of text does not exceed the threshold quantity of sets of text k, the first plurality of sets of text may comprise all of the second plurality of sets of text. In some examples, a plurality of scores associated with the second plurality of sets of text may be determined (e.g., each score of the plurality of scores may be associated with a set of text of the second plurality of sets of text). In an example, a first score (of the plurality of scores) associated with the first set of text may be determined based upon a measure of events, of the plurality of events, associated with the first set of text. For example, the measure of events may correspond to a quantity and/or frequency of events, of the plurality of events, associated with the first set of text. In an example in which the first set of text is a product name, the measure of events may correspond to a quantity and/or frequency of events, of the plurality of events, in which an internet resource, of the one or more first internet resources, comprising an indication of the product name is accessed. In some examples, the first score may be based upon (e.g., may be equal to) the measure of events associated with the first set of text (e.g., the first score may be a function of the measure of events, wherein an increase of the measure of events results in an increase of the first score). Other scores of the plurality of scores (other than the first score) may be determined using one or more of the techniques provided herein with respect to determining the first score.

The first plurality of sets of text (used to generate the first user intention-based representation) may be selected from the second plurality of sets of text based upon the plurality of scores. In some examples, the first plurality of sets of text may be selected from the second plurality of sets of text based upon a determination that the first plurality of sets of text are associated with highest scores of the plurality of scores. Alternatively and/or additionally, the first plurality of sets of text may be selected from the second plurality of sets of text based upon a determination that the first plurality of sets of text are associated with k highest scores of the plurality of scores (e.g., sets of text associated with the k highest scores of the plurality of scores may be included in the first plurality of sets of text). In an example where k (e.g., the threshold quantity of sets of text) is 1,000, 1,000 sets of text associated with 1,000 highest scores of the plurality of scores may be selected and/or included in the first plurality of sets of text. Alternatively and/or additionally, the second plurality of sets of text may be ranked based upon the plurality of scores (e.g., a set of text having a higher score of the plurality of scores is ranked higher than a set of text having a lower score of the plurality of scores), and/or the top k ranked sets of text may be selected from among the second plurality of sets of text (e.g., the top k ranked sets of text may be included in the first plurality of sets of text). Alternatively and/or additionally, the first plurality of sets of text may be selected from the second plurality of sets of text based upon a determination that the first plurality of sets of text are associated with scores (of the plurality of scores) that meet (e.g., are equal to or exceed) a first threshold score (e.g., sets of text that are associated with scores, of the plurality of scores, that do not meet the first threshold score, may not be included in first plurality of sets of text).

At 606, a plurality of term representations may be determined based upon the first plurality of sets of text. In an example, the plurality of term representations may comprise at least one of one or more first term representations of one or more first terms of a first set of text of the first plurality of sets of text, one or more second term representations of one or more second terms of a second set of text of the first plurality of sets of text, etc.

In an example, a term of a set of text may correspond to at least one of a token, a word, a phrase, a portion, etc. of the set of text. In an example, a tokenization module may be used to split a set of text of the first plurality of sets of text into terms (e.g., words), wherein the plurality of term representations may comprise term representations of the terms. In some examples, one, some and/or all term representations of the plurality of term representations are vector representations (e.g., embeddings and/or embedding-based representations) of terms of the first plurality of sets of text. In an example, one, some and/or all term representations of the plurality of term representations are word vector representations (e.g., word embeddings and/or word embedding-based representations) of words of the first plurality of sets of text.

For example, the plurality of term representations may comprise a plurality of sets of term representations, wherein for each set of text of the first plurality of sets of text, the plurality of sets of term representations comprises a set of term representations comprising one or more term representations of one or more terms of the set of text. In an example, a first set of term representations of the plurality of sets of term representations may comprise the one or more first term representations of the one or more first terms of the first set of text, a second set of term representations of the plurality of sets of term representations may comprise the one or more second term representations of the one or more second terms of the second set of text, etc.

In some examples, term representations of the plurality of term representations are combined to generate a term representation data structure associated with the first internet resource identification item. In an example, some and/or all sets of term representations of the plurality of sets of term representations are concatenated to generate the term representation data structure, such as using one or more of the techniques provided herein with respect to the term representation data structure 532.

At 608, a first user intention-based representation associated with the first internet resource identification item may be generated based upon the plurality of term representations. For example, the first user intention-based representation may be generated based upon the term representation data structure. The first user intention-based representation may be generated using one or more of the techniques provided with respect to act 408 of the example method 400.

In some examples, a plurality of user intention-based representations associated with a plurality of internet resource identification items may be generated. For example, the plurality of user intention-based representations may comprise the first user intention-based representation and/or the plurality of internet resource identification items may comprise the first internet resource identification item. In an example, each internet resource identification item of the plurality of internet resource identification items may be associated with one or more internet resources. In some examples, the plurality of user intention-based representations may comprise the first user intention-based representation associated with the first internet resource identification item, a second user intention-based representation associated with a second internet resource identification item (of the plurality of internet resource identification items), etc.

In some examples, using one or more of the techniques provided herein, user intention-based representations of the plurality of user intention-based representations are generated in an unsupervised manner, thereby providing for less (and/or zero) manual effort required to generate the plurality of user intention-based representations.

In some examples, a similarity profile may be generated based upon the plurality of user intention-based representations. For example, the similarity profile may be indicative of similarity scores corresponding to levels of similarity between internet resource identification items of the plurality of internet resource identification items.

In some examples, using one or more of the techniques provided herein, the plurality of user intention-based representations (e.g., the similarity profile generated based upon the plurality of user intention-based representations) may be used for at least one of categorization of internet resource identification items, information propagation among profiles associated with internet resource identification items, grouping internet resource identification items into groups, etc.

In an example, a first profile associated with the first internet resource identification item may be generated based upon information determined for one or more other internet resource identification items of the plurality of internet resource identification items. For example, the information associated with the one or more other internet resource identification items may be propagated to the first profile associated with the first internet resource identification item (such as using one or more of the techniques provided herein with respect to the example method 400 of FIG. 4, such as generating the first profile 560 and/or including the one or more sets of information 558 in the first profile 560).

At 610, a first content item may be selected for presentation via a first client device based upon the first user intention-based representation. For example, the first content item may be selected for presentation via the first client device based upon the first profile (that is determined based upon the first user intention-based representation). For example, the first content item may be selected for presentation via the first client device based upon the first profile and/or first targeting information associated with the first content item (such as using one or more of the techniques provided herein with respect to act 410 of the example method 400). In some examples, the first content item may be selected and/or presented by a content system.

In some examples, the first content item may comprise at least one of an article, a video, an audio file, an image, a web page, an advertisement, an email, a message, a content suggestion, etc. In response to selecting the first content item for presentation via the first client device, the first content item may be transmitted to the first client device. The first content item may be displayed via the first client device. Alternatively and/or additionally, in an example where the first content item comprises audio, the audio may be played via the first client device (e.g., the audio may be output via a speaker associated with the first client device).

In some examples, the first content item may be selected for presentation via the first client device in response to receiving a first request for content. The first request for content may be received in response to the first client device accessing a second internet resource associated with the content system. For example, the first client device may transmit a request to access the second internet resource to a server associated with the second internet resource. In response to receiving the request to access the second internet resource, the server associated with the second internet resource may transmit the first request for content to the content system (and/or to a server associated with the content system). Alternatively and/or additionally, the first request for content may be received from the first client device. In some examples, the first request for content may correspond to a request to be provided with a content item (e.g., an advertisement, an image, a link, a video, etc.) for presentation via the second internet resource.

In an example, the first internet resource identification item may correspond to a domain name of one or more email addresses. The first profile associated with the first internet resource identification item may be used for selecting the first content item (in response to the first request for content, for example) based upon a determination that the first client device is associated with an event associated with the first internet resource identification item. In an example, the event may comprise an email associated with the first internet resource identification item being sent to an email account associated with the first client device and/or the email being accessed via an email interface on the first client device. In an example, it may be determined that the email is associated with the first internet resource identification item based upon a determination that an email address of an email sender of the email comprises and/or matches the first internet resource identification item (e.g., the first internet resource identification item may comprise "floridastuff-.com" and/or the email address of the email sender may be "marketing@floridastuff.com"). In an example, the first profile is indicative of one or more characteristics of content provided by emails associated with the first internet resource identification item (e.g., emails that are sent by email addresses that comprise and/or match the first internet resource identification item). The one or more characteristics indicated by the first profile may be compared with one or more characteristics of the first targeting information to determine one or more matching characteristics, wherein whether or not the first client device is part of a target audience of the first content item is determined based upon the one or more matching characteristics. The first content item may be selected for presentation via the first client device based upon a determination that the first client device is part of the target audience of the first content item.

It may be appreciated that the disclosed subject matter may assist a user (and/or a client device associated with the user) in receiving and/or consuming content that the user may have an interest in. For example, the content selected for transmission to the client device may be selected based upon a determination that the user is part of a target audience of the content. Accordingly, a probability that the user is interested in the content may be increased.

Implementation of at least some of the disclosed subject matter may lead to benefits including, but not limited to, more accurate selection of content items for presentation via client devices (e.g., as a result of generating the plurality of user intention-based representations associated with the plurality of internet resource identification items, as a result of generating the similarity profile associated with the plurality of internet resource identification items based upon the plurality of user intention-based representations, as a result of propagating information associated with one or more internet resource identification items to a profile associated with an internet resource identification item based upon the similarity profile such that the profile associated with the internet resource identification item has an increased amount of information, as a result of selecting content for presentation via a client device based upon the profile with the increased amount of information, etc.).

Alternatively and/or additionally, implementation of the disclosed subject matter may lead to benefits including determining profile information associated with internet resource identification items with a reduced amount of manual effort (e.g., as a result of using the similarity profile to propagate information associated with one or more internet resource identification items to profiles associated with other internet resource identification items such that information does not need to be manually determined separately for each internet resource identification item of the plurality of internet resource identification items).

Alternatively and/or additionally, implementation of the disclosed subject matter may lead to benefits including increased user privacy (e.g., as a result of generating the plurality of user intention-based representations using aggregated user data on an aggregate level such that the user-intention based representations may be user-agnostic).

Alternatively and/or additionally, implementation of the disclosed subject matter may lead to benefits including an increase in generalized revenue for presenting content items via client devices (e.g., as a result of more accurately selecting content items for presentation via client devices such that a probability of receiving a positive signal responsive to presentation of a selected content item (e.g., an advertisement click, a conversion event, etc.), and/or a probability of receiving revenue as a result of the positive signal, are increased due to the more accurate selection of the content items).

Alternatively and/or additionally, implementation of at least some of the disclosed subject matter may lead to benefits including a reduction in screen space and/or an improved usability of a display (e.g., of a client device) (e.g., as a result of enabling a user of the client device to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including a more accurate and precise control of transmission of content items to intended users (e.g., as a result of more accurately determining that a user is part of a target audience of a content item and/or selecting the content item based upon the more accurate determination, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 7:
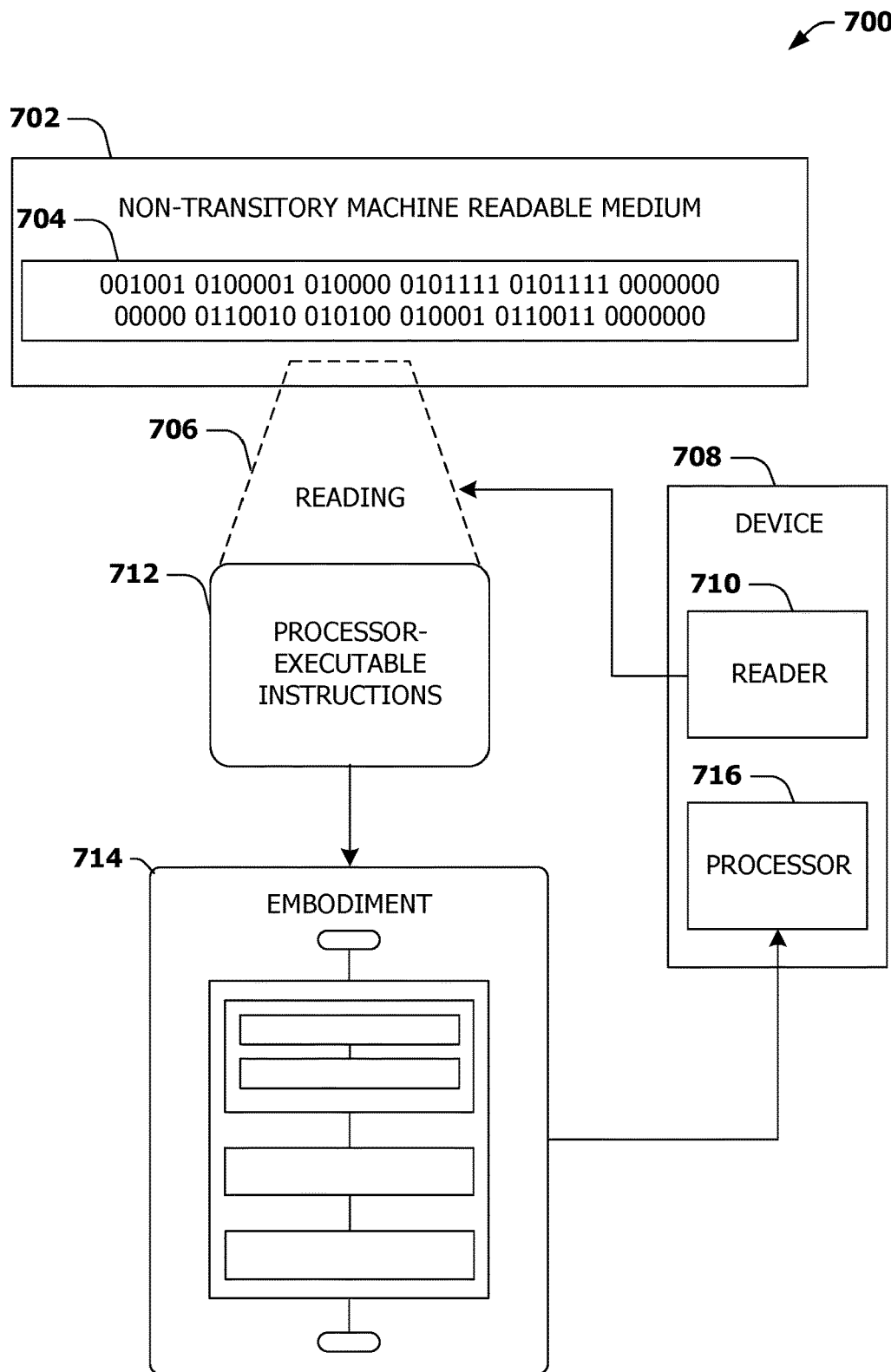
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4 and/or at least some of the example method 600 of FIG. 6, for example. In some embodiments, the processor-executable instructions 712 are configured to cause implementation of a system, such as at least some of the example system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying a first internet resource identification item associated with one or more first internet resources;
   analyzing user activity information associated with a plurality of events to determine a plurality of search queries associated with the first internet resource identification item, wherein each search query of the plurality of search queries is associated with an event, of the plurality of events, in which an internet resource of the one or more first internet resources is accessed via a selection of a search result from among search results generated based upon the search query;
   determining a plurality of term representations based upon the plurality of search queries, wherein the plurality of term representations comprises:
      one or more first term representations of one or more first terms of a first search query of the plurality of search queries; and
      one or more second term representations of one or more second terms of a second search query of the plurality of search queries;
   determining, based upon a plurality of metrics associated with term representations of the plurality of term representations, weights associated with the term representations, wherein a metric of the plurality of metrics is associated with a term representation of the plurality of term representations and corresponds to a measure of instances of a term associated with the term representation in a set of text;
   generating a first user intention-based representation associated with the first internet resource identification item, wherein the generating the first user intention-based representation comprises combining the plurality of term representations based upon the weights; and
   selecting a first content item for presentation via a first client device based upon the first user intention-based representation.

2. The method of claim 1, wherein the determining the plurality of search queries comprises:
   determining a second plurality of search queries, associated with the first internet resource identification item, based upon the user activity information, wherein the second plurality of search queries comprises the plurality of search queries; and
   determining a plurality of search query scores associated with the second plurality of search queries, wherein the determining the plurality of search query scores comprises:
      determining a first search query score, of the plurality of search query scores, associated with the first search query based upon a measure of events, of the plurality of events, associated with the first search query; and
      determining a second search query score, of the plurality of search query scores, associated with the second search query based upon a measure of events, of the plurality of events, associated with the second search query.

3. The method of claim 2, comprising:
   selecting the plurality of search queries, from the second plurality of search queries, based upon the plurality of search query scores.

4. The method of claim 1, comprising:
   generating, based upon the first user intention-based representation and a plurality of user intention-based representations, a similarity profile indicative of similarity scores corresponding to levels of similarity between internet resource identification items of a second plurality of internet resource identification items.

5. The method of claim 1, wherein:
   the first content item is selected based upon one or more first characteristics associated with a second internet resource identification item in a same group as the first internet resource identification item.

6. The method of claim 5, wherein:
   the first content item is selected based upon one or more second characteristics associated with a target audience of the first content item.

7. The method of claim 1, comprising:
   generating, based upon the first user intention-based representation and a plurality of user intention-based representations, a similarity profile indicative of similarity scores corresponding to levels of similarity between internet resource identification items of a second plurality of internet resource identification items comprising the first internet resource identification item and a plurality of internet resource identification items; and
   determining a plurality of sets of information associated with a subset of internet resource identification items of the second plurality of internet resource identification items.

8. The method of claim 7, comprising:
   generating a profile associated with the first internet resource identification item based upon the plurality of sets of information and similarity scores, of the similarity profile, corresponding to levels of similarity between the first internet resource identification item and internet resource identification items of the subset of internet resource identification items.

9. The method of claim 1, comprising:
   in response to the selecting the first content item for presentation via the first client device, transmitting the first content item to the first client device.

10. The method of claim 1, wherein:
    the first internet resource identification item comprises at least a portion of a domain name.

11. The method of claim 1, wherein:
    the one or more first internet resources comprise a web page having a web address comprising the first internet resource identification item.

12. The method of claim 1, wherein:
    the selecting the first content item for presentation via the first client device is performed in response to receiving a first request for content associated with the first client device.

13. A computing device comprising:
    a processor; and
    memory comprising processor-executable instructions that when executed by the processor cause performance of operations, the operations comprising:

identifying a first internet resource identification item associated with one or more first internet resources;

analyzing user activity information associated with a plurality of events to determine a plurality of sets of text associated with the first internet resource identification item, wherein each set of text of the plurality of sets of text is associated with an event, of the plurality of events, associated with an internet resource of the one or more first internet resources;

determining a plurality of term representations based upon the plurality of sets of text, wherein the plurality of term representations comprises:
- one or more first term representations of one or more first terms of a first set of text of the plurality of sets of text; and
- one or more second term representations of one or more second terms of a second set of text of the plurality of sets of text;

determining, based upon a plurality of metrics associated with term representations of the plurality of term representations, weights associated with the term representations, wherein a metric of the plurality of metrics is associated with a term representation of the plurality of term representations and corresponds to a measure of instances of a term associated with the term representation in a set of text;

generating a first user intention-based representation associated with the first internet resource identification item, wherein the generating the first user intention-based representation comprises combining the plurality of term representations based upon the weights; and selecting a first content item for presentation via a first client device based upon the first user intention-based representation.

14. The computing device of claim 13, the determining the plurality of sets of text comprises:
determining a second plurality of sets of text, associated with the first internet resource identification item, based upon the user activity information, wherein the second plurality of sets of text comprises the plurality of sets of text;

determining a plurality of scores associated with the second plurality of sets of text, wherein the determining the plurality of scores comprises:
- determining a first score, of the plurality of scores, associated with the first set of text based upon a measure of events, of the plurality of events, associated with the first set of text; and
- determining a second score, of the plurality of scores, associated with the second set of text based upon a measure of events, of the plurality of events, associated with the second set of text; and selecting the plurality of sets of text, from the second plurality of sets of text, based upon the plurality of scores.

15. The computing device of claim 13, the operations comprising:
generating, based upon the first user intention-based representation and a plurality of user intention-based representations, a similarity profile indicative of similarity scores corresponding to levels of similarity between internet resource identification items of a second plurality of internet resource identification items.

16. The computing device of claim 13, wherein:
the first content item is selected based upon one or more first characteristics associated with a second internet resource identification item in a same group as the first internet resource identification item.

17. The computing device of claim 13, the operations comprising:
generating, based upon the first user intention-based representation and a plurality of user intention-based representations, a similarity profile indicative of similarity scores corresponding to levels of similarity between internet resource identification items of a second plurality of internet resource identification items comprising the first internet resource identification item and a plurality of internet resource identification items;

determining a plurality of sets of information associated with a subset of internet resource identification items of the second plurality of internet resource identification items; and generating a profile associated with the first internet resource identification item based upon the plurality of sets of information and similarity scores, of the similarity profile, corresponding to levels of similarity between the first internet resource identification item and internet resource identification items of the subset of internet resource identification items.

18. A non-transitory machine readable medium having stored thereon processor-executable instructions that when executed cause performance of operations, the operations comprising:
identifying a first internet resource identification item associated with one or more first internet resources;

analyzing user activity information associated with a plurality of events to determine a plurality of sets of text associated with the first internet resource identification item, wherein each set of text of the plurality of sets of text is associated with an event, of the plurality of events, associated with an internet resource of the one or more first internet resources;

determining a plurality of term representations based upon the plurality of sets of text, wherein the plurality of term representations comprises:
- one or more first term representations of one or more first terms of a first set of text of the plurality of sets of text; and
- one or more second term representations of one or more second terms of a second set of text of the plurality of sets of text;

determining, based upon a plurality of metrics associated with term representations of the plurality of term representations, weights associated with the term representations, wherein a metric of the plurality of metrics is associated with a term representation of the plurality of term representations and corresponds to a measure of instances of a term associated with the term representation in a set of text;

generating a first user intention-based representation associated with the first internet resource identification item, wherein the generating the first user intention-based representation comprises combining the plurality of term representations based upon the weights; and selecting a first content item for presentation via a first client device based upon the first user intention-based representation.

19. The non-transitory machine readable medium of claim 18, the operations comprising:
identifying an event, associated with the first client device, in which an internet resource of the one or more first internet resources associated with the first internet resource identification item is accessed, wherein the selecting the first content item for presentation via the first client device is based upon first targeting information associated with the first content item.

20. The non-transitory machine readable medium of claim 19, the operations comprising:
  in response to the selecting the first content item for presentation via the first client device, transmitting the first content item to the first client device.

* * * * *